US009283485B2

(12) United States Patent
Toda et al.

(10) Patent No.: US 9,283,485 B2
(45) Date of Patent: Mar. 15, 2016

(54) GAME CONTROL DEVICE, GAME CONTROL METHOD, PROGRAM, AND GAME SYSTEM

(71) Applicant: Konami Digital Entertainment Co., Ltd., Minato-ku, Tokyo (JP)

(72) Inventors: Takahiro Toda, Tokyo (JP); Taku Endo, Kawasaki (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 133 days.

(21) Appl. No.: 13/796,378

(22) Filed: Mar. 12, 2013

(65) Prior Publication Data

US 2013/0331190 A1 Dec. 12, 2013

(30) Foreign Application Priority Data

Jun. 8, 2012 (JP) ................................. 2012-131431

(51) Int. Cl.
*A63F 13/12* (2006.01)
*A63F 13/79* (2014.01)
*A63F 13/30* (2014.01)
*A63F 13/49* (2014.01)
*A63F 13/88* (2014.01)

(52) U.S. Cl.
CPC ................. *A63F 13/79* (2014.09); *A63F 13/12* (2013.01); *A63F 13/49* (2014.09); *A63F 13/88* (2014.09); *A63F 2300/5546* (2013.01)

(58) Field of Classification Search
CPC ....... A63F 13/79; A63F 13/828; A63F 13/85; A63F 2300/5546
USPC ....................................................... 463/40–42
See application file for complete search history.

(56) References Cited

U.S. PATENT DOCUMENTS 6,652,378 B2 * 11/2003 Cannon et al. .................. 463/20
8,360,873 B1 * 1/2013 Wickett et al. .................. 463/29
8,764,568 B2 * 7/2014 Holme et al. .................... 463/42

(Continued)

FOREIGN PATENT DOCUMENTS

JP 2010-239989 A 10/2010
KR 10-2012-0012053 A 2/2012

OTHER PUBLICATIONS

Spinhead. [Tutorial] Energy System [online]. Aug. 24, 2011 [retrieved Mar. 17, 2015]. Retrieved from the Internet: <URL: http://forum.koramgame.com/thread-43931-1-1.html>.*

(Continued)

*Primary Examiner* — Dmitry Suhol
*Assistant Examiner* — David Duffy
(74) *Attorney, Agent, or Firm* — Global IP Counselors, LLP

(57) ABSTRACT

There is provided a game control device that allows a user, while executing or intending to execute a certain game, to know information about himself or herself in relation to another game. The game control device includes an execution means for executing a first game, a first determining means for determining whether a state of the first game satisfies a first condition when the user is executing the first game, an information obtaining means for obtaining user information of the user for a second game associated with the first game when the first condition is determined to be satisfied by the first determining means, and a notifying means for notifying the user about the user information for the second game obtained by the information obtaining means.

21 Claims, 20 Drawing Sheets

(56) References Cited

U.S. PATENT DOCUMENTS

| | | |
|---|---|---|
| 2010/0255917 A1 | 10/2010 | Nemoto et al. |
| 2010/0273545 A1* | 10/2010 | Salonen .......................... 463/11 |
| 2012/0142429 A1* | 6/2012 | Muller ............................ 463/42 |
| 2013/0029760 A1* | 1/2013 | Wickett et al. .................. 463/29 |
| 2013/0143669 A1* | 6/2013 | Muller ............................ 463/42 |
| 2014/0038726 A1* | 2/2014 | Sareli et al. ..................... 463/42 |

OTHER PUBLICATIONS

Appli Style, vol. 5 (Eastpress Co., Ltd., Nov. 1, 2011) p. 7-8, Nov. 1, 2011.

Korean Office Action of the corresponding Korean Application No. 10-2013-0027975, dated May 26, 2014.

* cited by examiner

| User ID | User name | Progress level | Power points | Experience value | User IDs of friends | Owned cards | Owned items |
|---|---|---|---|---|---|---|---|
| 000001 | KNM | Lv35 | 100 | 50 | 000123, ⋮ | C1, ⋯ | Im1,⋯ |
| 000002 | ABC | Lv10 | 60 | 60 | 000345, ⋮ | C8, ⋯ | Im4,⋯ |
| ⋮ | ⋮ | ⋮ | ⋮ | ⋮ | ⋮ | ⋮ | ⋮ |

User database

FIG.6

| Game | Associated games | | | |
|---|---|---|---|---|
| A | B | E | — | |
| B | A | C | ... | |
| C | B | G | ... | |
| ⋮ | ⋮ | ⋮ | ⋮ | ⋮ |

FIG.10A

| User ID | Associated games | | | |
|---|---|---|---|---|
| 000001 | A | B | F | — |
| 000002 | C | D | Q | ... |
| 000003 | A | B | L | ... |
| ⋮ | ⋮ | ⋮ | ⋮ | ⋮ |

FIG.10B

GAME CONTROL DEVICE, GAME CONTROL METHOD, PROGRAM, AND GAME SYSTEM

CROSS-REFERENCE TO RELATED APPLICATIONS

This application is based upon and claims the benefit of priority of the prior Japanese Patent Application No. 2012-131431, filed on Jun. 8, 2012, the entire contents of which are incorporated herein by reference.

FIELD

The present invention relates to a technique for controlling progress by a plurality of users in a game in accordance with various operations by the users.

BACKGROUND

Recently, so-called social networking games are executed on game applications created on the basis of operating environments such as application programming interfaces (API) operated on a web browser in a social networking service (SNS) provided by a specific service provider. Social network games may be called a type of online game played between a plurality of unspecified users while communicating with each other. A user who is able to connect to the Internet and has a communication terminal including a web browser is able to enjoy social networking games regardless of the time or location.

A digital card game called Dragon Collection (trademark) described in a Japanese magazine (*Appli Style*, Vol. 5 (Eastpress Co., Ltd., Nov. 1, 2011) p. 7-8) is an example of a social networking game.

In social networking games, power points for a user, for example, may be set and points (e.g., power points) may be consumed in the progress of the game so that when no more points can be consumed the user is not able to progress any further in the game. In order to increase (restore) a certain amount of points in a certain time period, for example, a mechanism allows the user to once again proceed in the game after an amount of time has elapsed.

Meanwhile, a user may be registered in a plurality of social networking games. When a user is not able to proceed in a game after playing one of the games in which the user is registered, the user conventionally selects another game that can be played among the registered games and plays the selected game. In this case for example, since the user does not know any information about whether enough points to be able to proceed satisfactorily in the game have been restored until the user accesses that game, the user is required to access the registered game at random in order to check whether he is able to satisfactorily proceed in the game, which is tedious.

In consideration of the above problem, an object of the present invention is to provide a game control device, a game control method, a program, and a game system that allow a user, while playing or intending to play a certain game, to know information about himself or herself in relation to another game.

SUMMARY

A first aspect of the present invention is a game control device comprising:
 an executing means for executing a first game;
 a first determining means for determining whether an execution state of a user for the first game satisfies a first condition;
 an information obtaining means for obtaining user information of the user for a second game associated with the first game when the first condition is determined to be satisfied by the first determining means; and
 a notifying means for notifying the user about the user information for the second game obtained by the information obtaining means.

The game control device further may comprise: a state obtaining means for obtaining an execution condition of the user for the first game; wherein,
 the first determining means determines whether the first condition is satisfied on the basis of the user's execution state obtained by the state obtaining means; and
 the information obtaining means refers to a storage device that stores information in association with a game different from the first game, specifies the second game as a game associated with the first game, and obtains user information of the user for the second game.

In the game control device of the first aspect of the present invention, the user is notified about the user information for the second game associated with the first game when the execution state of the user for the first game satisfies the first condition. Consequently, the user executing the first game is able to learn about information (user information) about himself or herself with regard to the second game associated with the first game, and thus is able to adequately judge whether to progress or execute the second game.

The method of notifying the user about the user information may include a method of displaying the user information in a game image, or a method of outputting the user information by sound and the like.

A second aspect of the present invention is a game control device comprising:
 an executing means for executing a first game;
 a first determining means for determining whether a state of the first game satisfies a first condition when a user is executing the first game;
 an information obtaining means for obtaining user information of the user for a second game associated with the first game when the first condition is determined to be satisfied by the first determining means; and
 a notifying means for notifying the user about the user information for the second game obtained by the information obtaining means.

The above game control device may further comprise: a state obtaining means for obtaining a condition of the first game; wherein,
 the first determining means determines whether the first condition is satisfied on the basis of the state of the first game obtained by the state obtaining means; and
 the information obtaining means refers to a storage device that stores information in association with a game different from the first game, specifies the second game as a game associated with the first game, and obtains user information of the user for the second game.

In the game control device of the second aspect of the present invention, the user is notified about user information for the second game associated with the first game when the state of the first game satisfies the first condition. Consequently, the user intending to execute the first game is able to learn about information (user information) about himself or herself with regard to the second game associated with the first game, and thus is able to adequately judge whether to progress or execute the second game.

The method of notifying the user about the user information may include a method of displaying the user information in a game image, or a method of outputting the user information by sound and the like.

The above game control device may further comprise a selecting means for obtaining registration information of the user from a storage device that stores the registration information related to the user, and selecting, on the basis of the registration information, one or a plurality of the second games from games associated with the first game.

By selecting the second game on the basis of the user registration information, the user can be induced to execute a game suited to that user. Consequently, the user is able to switch in a smooth manner from the first game to the second game at the point in time when the first game cannot be progressed.

The registration information in the game control device may include information related to the gender or age of the user. For example, by allowing information about the gender of a user to be included, a male user can be notified about user information of a male-oriented second game, and a female user can be notified about user information of a female-oriented second game.

A third aspect of the present invention is a game control device comprising:

an executing means for executing a first game;

a first determining means for determining whether an execution state of a user for the first game satisfies a first condition;

an information obtaining means for obtaining user information for a second game associated with the user when the first condition is determined to be satisfied by the first determining means; and a notifying means for notifying the user about the user information for the second game obtained by the information obtaining means.

The above game control device may further comprise a state obtaining means for obtaining an execution state of the user for the first game; wherein, the first determining means determines whether the first condition is satisfied on the basis of the execution state of the user obtained by the state obtaining means; and the information obtaining means refers to a storage device that stores information related to an association of a game and the user, specifies the second game as a game associated with the user, and obtains user information of the user for the second game.

In the game control device of the third aspect of the present invention, the user is notified about user information for the second game associated with that user when the execution state of the user for the first game satisfies the first condition. Consequently, the user executing the first game is able to learn about information (user information) about himself or herself with regard to the second game associated with himself or herself, and thus is able to adequately judge whether to progress or execute the second game.

The method of notifying the user about the user information may include a method of displaying the user information in a game image, or a method of outputting the user information by sound and the like.

A fourth aspect of the present invention is a game control device comprising:

an executing means for executing a first game;

a first determining means for determining whether a state of the first game satisfies a first condition when a user is executing the first game;

an information obtaining means for obtaining user information of the second game associated with the user when the first condition is determined to be satisfied by the first determining means; and a notifying means for notifying the user about the user information for the second game obtained by the information obtaining means.

The above game control device may further comprise a state obtaining means for obtaining a state of the first game; wherein, the first determining means determines whether the first condition is satisfied on the basis of the state of the first game obtained by the state obtaining means; and the information obtaining means refers to a storage device that stores information related to an association of a game and the user, specifies the second game as a game associated with the user, and obtains user information of the user for the second game.

In the game control device of the fourth aspect of the present invention, the user is notified about user information about the second game associated with the user when the state of the first game satisfies the first condition. Consequently, the user intending to execute the first game is able to learn about information (user information) about himself or herself with regard to the second game associated with himself or herself when, for example, a state in which the first game cannot be executed exists, and thus is able to adequately judge whether to progress or execute the second game.

The method of notifying the user about the user information may include a method of displaying the user information in a game image, or a method of outputting the user information by sound and the like.

The first game in the above game control device has user information that includes a parameter that fluctuates in accordance with the game progression, and the first game may be a game in which the game progression is hampered when a value of the parameter is in a certain range, and the first condition may be that the value of the parameter of the user for the first game be in the certain range. At this time, the user cannot progress in the first game when the first condition is determined to have been satisfied. Under this state, the user information for a second game that is different from the first game becomes particularly convenient for the user so that the user can start the second game according to the user information of the second game.

The first condition in the above game control device is a state in which the first game cannot be executed. "A state in which the first game cannot be executed" is a state in which the execution of the first game cannot be started due to, for example, maintenance and the like by the game operator of the first game. Under this state, the user information for the second game that is different from the first game becomes particularly convenient for the user so that the user can start the second game according to the user information of the second game.

The above game control device may further comprise a second determining means for determining whether the user information of the user for the second game obtained by the information obtaining means satisfies a second condition, wherein the notifying means may notify the user about the user information of the user of the second game when the second determining means determines that the second condition is satisfied.

By notifying the user about the user information when the second condition is satisfied instead of notifying the user about the user information of the second game randomly, the user can be notified about the user information of a suitable second game. For example, when information (e.g., information such as the power points for progressing the game) about whether the second game can be progressed by the user is included as the user information of the second game, the user information of the second game that can be progressed can be notified on the basis of the second condition, and the user can be made aware that the second game can be progressed at the point in time that the first game cannot be progressed.

The information obtaining means in the above game control device may obtain the user information of the second game from a game control device that executes the second game. Traffic is advantageously reduced by conducting the exchange of the user information directly between the game control devices since the exchange of the information is conducted without passing through another device.

The information obtaining means in the above game control device may obtain the user information of the second game from an information management device having user information for a plurality of games. Since the user information of a plurality of games is controlled in the information management device in an integrated manner in this configuration, the game control devices can reliably obtain the user information from the information management device even if, for example, communication between the game control devices is hampered.

The notifying means in the above game control device may cause the user information of the second game to be displayed in a game image of the first game. Although the user information notification method to the user may be a method of outputting the user information by sound, by employing a method of displaying the user information in a game image, the user is able to recognize the game images even when in an environment (e.g., in a public transportation facility) where, for example, the output of sound is restricted. Furthermore, the user may fail to hear the user information when outputting the user information by sound, and thus unreliability of transmitting the information can be reduced by displaying the user information.

The notifying means in the above game control device may cause information indicating the fact that the first condition has been satisfied to be displayed in the game image in addition to displaying the user information in the game image. Any method can be used as a display method such as a display with text or a display with a mark or other pattern. Consequently, it is convenient for the user since the required information is displayed with a single game image. Moreover, the time when an executed game is continued but cannot be executed further is a time that another game can be played (another game can be executed). However, the importance of the display of the information of the other game increases when considering which game to play next when notified that the game that is being executed cannot be continued.

The notifying means in the above game control device may cause an operating target for starting execution of the second game to be additionally displayed in the game image of the first game. As a result, user information of the second game can be quickly recognized when accessing the first game, while executing the first game, or when the first game cannot be progressed.

A fifth aspect of the present invention is a program that causes a computer to realize:
a function for executing a first game;
a function for determining whether an execution state of a user for the first game satisfies a first condition;
a function for obtaining user information of the user for a second game associated with the first game when the first condition is determined to be satisfied; and
a function for notifying the user about the obtained user information for the second game.

A sixth aspect of the present invention is a program that causes a computer to realize:
a function for executing a first game;
a function for determining whether a state of the first game satisfies a first condition when a user is executing the first game;
a function for obtaining user information of the user for a second game associated with the first game when the first condition is determined to be satisfied; and
a function for notifying the user about the obtained user information for the second game.

A seventh aspect of the present invention is a program that causes a computer to realize:
a function for executing a first game;
a function for determining whether an execution state of a user for the first game satisfies a first condition;
an function for obtaining user information for the second game associated with the user when the first condition is determined to be satisfied; and
a function for notifying the user about the obtained user information for the second game.

An eighth aspect of the present invention is a program that causes a computer to realize:
a function for executing a first game;
a function for determining whether a state of the first game satisfies a first condition when a user is executing the first game;
a function for obtaining user information of a second game associated with the user when the first condition is determined to be satisfied; and
a function for notifying the user about the obtained user information for the second game.

The computer may be, for example, a network server or a large computing device. The program may be stored on a computer readable storage medium such as a DVD-ROM or a CD-ROM and the like.

A ninth aspect of the present invention is a game control method for a game system that includes a first server that executes a first game in accordance with an access from a communication terminal and stores or updates, for each user, user information that is information related to the user on the first game in a storage device, and a second server that executes a second game in accordance with an access from a communication terminal and stores or updates, for each user, user information that is information related to the user on the second game in a storage device.

The game control method includes the steps of:
the first server determining whether an execution state of the first game by the user or a state of the first game satisfies a first condition;
the first server requesting the user information of the second game of the user when the first condition is determined to have been satisfied;
the second server providing the user information of the second game of the user to the first server in accordance with the requesting; and the first server transmitting the user information of the second game of the user to a communication terminal of the user.

A tenth aspect of the present invention is a game system that includes a first server that executes a first game in accordance with an access from a communication terminal and stores or updates, for each user, user information that is information related to the user on the first game in a storage device, and a second server that executes a second game in accordance with an access from a communication terminal and stores or updates, for each user, user information that is information related to the user on the second game in a storage device. In this game system the first server includes:

a first determining means for determining whether an execution state of the first game by a user or a state of the first game satisfies a first condition;

an information obtaining means for obtaining user information of the user for a second game different from the first game when the first condition is determined to be satisfied by the first determining means; and a notifying means for transmitting the user information for the second game obtained by the information obtaining means to a communication terminal of the user; and the second server includes:

a providing means for providing the user information for the second game of the user to the first server in accordance with the request from the first server.

An eleventh aspect of the present invention is a game system that includes a first server that executes a first game in accordance with an access from a communication terminal, a second server that executes a second game in accordance with an access from a communication terminal, and a supervisory server that is connected to the first server and the second server and includes a storage device that stores, for each user, user information that is information related to a user on the first game and user information that is information related to a user on the second game. In the game system, the first server includes:

a first determining means for determining whether an execution state of the first game by a user or a state of the first game satisfies a first condition;

an information obtaining means for obtaining, from the supervisory server, the user information of the user for the second game that is different from the first game when the first condition is determined to be satisfied by the first determining means; and a notifying means for transmitting the user information for the second game obtained by the information obtaining means to a communication terminal of the user; and the supervisory server includes:

a storage means for obtaining the user information for the second game of the user from the second server and storing or updating the user information in the storage device, and a providing means for providing the user information of the second game of the user to the first server in accordance with the request from the first server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Referring now to the attached drawings which form a part of this original disclosure:

FIG. 6 is an exemplary configuration diagram of user database included in the database server;

FIGS. 10A and 10B are exemplary diagrams of tables for describing relationships between a game and a game related to that game;

DESCRIPTION OF EMBODIMENT(S)

Hereinbelow, embodiments of the present invention will be described.

In the description of the present embodiment, "progressing the game" means causing a specific function of at least a portion of a plurality of functions that may be included in the game to be executed in response to a user operation. For example, in an example of the present embodiment, a quest (explained below) among the plurality of functions provided in the game may be executed in response to a user operation.

The inability to execute the quest in response to the user operation indicates that that user is not able to progress the game.

First Embodiment

(1) Configuration of Game System

Figure 1:
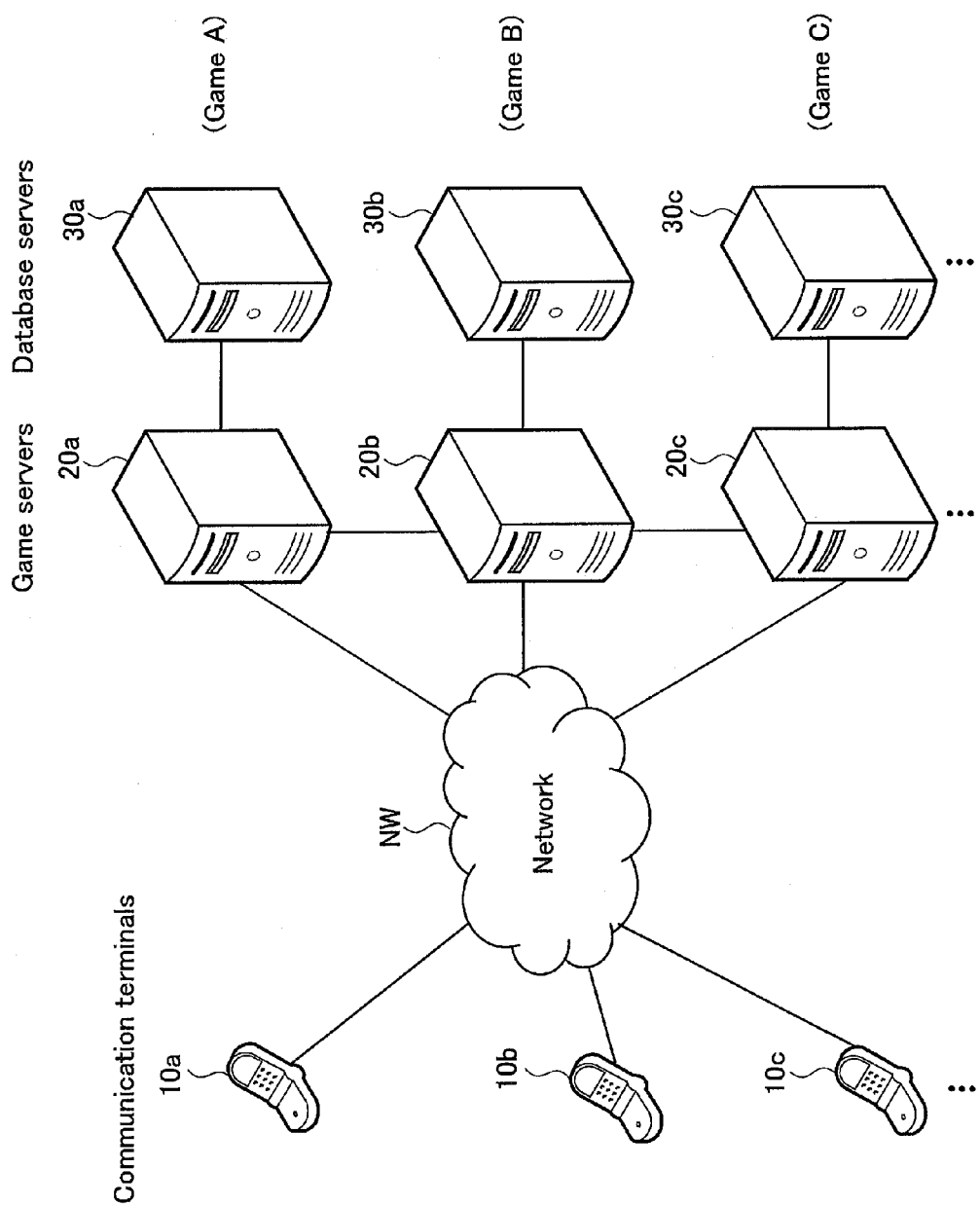
FIG. 1 is a basic configuration diagram of a game system according to a first embodiment.

FIG. 1 represents an exemplary system configuration of a game system according to the present embodiment. As represented in FIG. 1, the game system includes a plurality of communication terminals 10a, 10b, 10c and etc. that are connectable to a communication network NW such as the Internet, a plurality of game servers 20a, 20b, 20c and etc. that are connectable to the communication network NW, and a plurality of database servers 30a, 30b, 30c and etc. Each of the communication terminals 10a, 10b, 10c and etc. is a communication terminal to be operated by an individual user, such as a mobile terminal, a smartphone, a personal digital assistant (PDA), a personal computer, or a television receiver including a two-way communication function (including a so-called multi-functional smart TV), and the like. It should be noted that the communication terminals 10a, 10b, 10c and etc. will be hereinafter referred to as "communication terminal(s) 10" when describing them collectively. Similarly, the game servers 20a, 20b, 20c and etc. will be hereinafter referred to as "game server(s) 20" when describing them collectively. The database servers 30a, 30b, 30c and etc. will be hereinafter referred to as "database server(s) 30" when describing them collectively.

A game server 20a in the game system is configured to be communicable with the communication terminals 10 that are clients, and the game server 20a and a database server 30a provide a service related to a game A to the communication terminals 10. A game server 20b is configured to be communicable with the communication terminals 10 that are the clients, and the game server 20b and a database server 30b provide a service related to a game B to the communication terminals 10. A game server 20c is configured to be communicable with the communication terminals 10 that are the clients, and the game server 20c and a database server 30c provide a service related to a game C to the communication terminals 10. That is, the game servers are each configured to provide services for different games.

The game servers 20 are embedded with an application operable on a web browser as a game application. The database servers 30 store a variety of information for executing the games as described below, and are connected to the game servers 20 by means of a wired connection for example for reading and writing the information.

The communication terminal 10 includes a web browser that is able to display a web page provided by the game server 20. The user executes a game by performing an operation to select a menu and the like on the web page displayed by the communication terminal 10.

In addition to the game server 20, an authentication server, although not represented in FIG. 1, may be provided for authenticating respective users of the communication terminals 10. Further, in providing a plurality of the game servers 20 for receiving accesses from a large number of the communication terminals 10, a load balancer may be provided for regulating loads among the plurality of game servers 20. Furthermore, the game server 20 may be configured as a single server device or as a plurality of server devices among which functions are distributed.

(2) Communication Terminal Structure

The communication terminals 10 will be hereinafter explained with reference to FIGS. 2A, 2B, and 3.

Figure 2A:
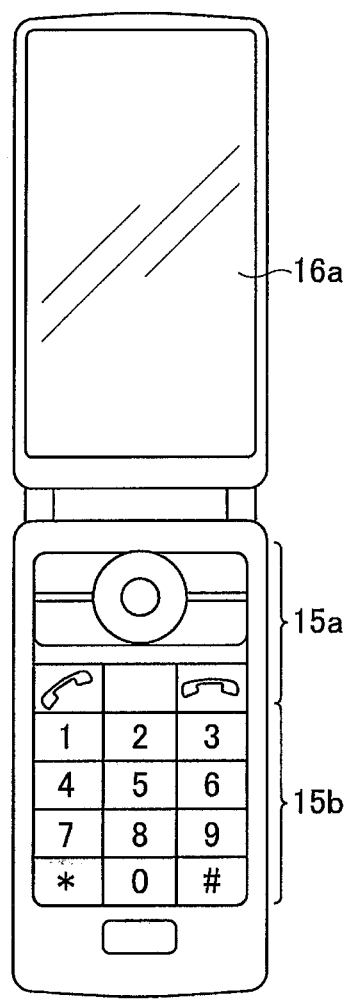
FIGS. 2A and 2B are external appearance examples of communication terminals according to the first embodiment.
Figure 2B:
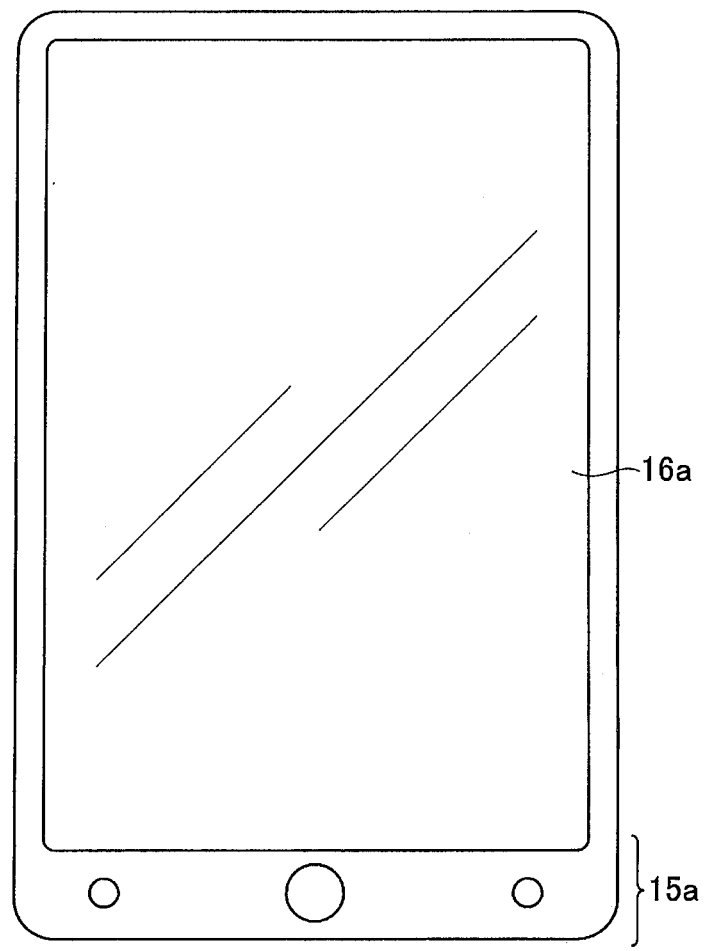

FIGS. 2A and 2B are external appearance examples of the communication terminals 10. FIG. 2A is an example of a communication terminal with a button input method such as a foldable mobile terminal (mobile telephone). FIG. 2B is an example of a communication terminal with a touch panel input method such as a smartphone. FIG. 3 is a configuration block diagram of the communication terminal 10.

Figure 3:
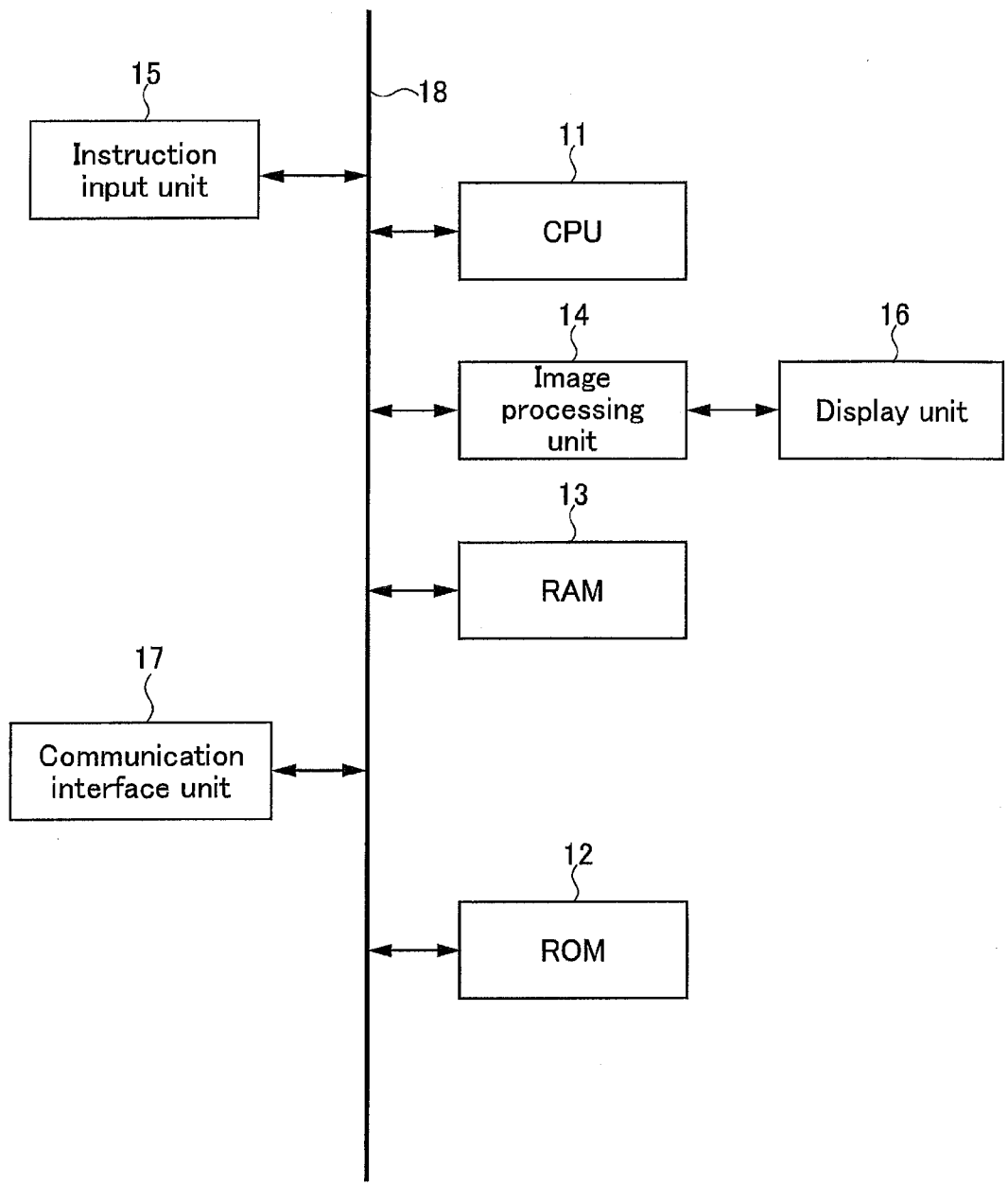
FIG. 3 is a configuration block diagram of a communication terminal according to the first embodiment.

As represented in FIG. 3, each communication terminal 10 includes a central processing unit (CPU) 11, a read-only memory (ROM) 12, a random access memory (RAM) 13, an image processing unit 14, an instruction input unit 15, a display unit 16, and a communication interface unit 17 as a signal reception unit. Further, each communication terminal 10 includes a bus 18 for transmitting control signals or data signals among the components.

The CPU 11 loads a web browser stored in the ROM 12 into the RAM 13 and executes the web browser therein. The CPU 11 obtains data for displaying a web page, namely, a hypertext markup language (HTML) document and data of objects such as images associated with the HTML document (hereinafter collectively referred to as "HTML data" on an as-needed basis), from the game server 20 through the communication interface unit 17 on the basis of an suitably specified uniform resource locator (URL) to be inputted by a user using the instruction input unit 15 and the like. The CPU 11 then interprets the obtained HTML data. It should be noted that each communication terminal 10 may be embedded with a variety of plug-ins for extending browsing functions of the web browser. One example of such a plug-in is Flash Player provided by Adobe Systems, Inc. (U.S.).

In obtaining the HTML data, the CPU 11 transmits an access request message to the game server 20 through the communication interface unit 17. The access request message herein includes either a preliminarily registered user ID (user identification information) or a user ID inputted through the instruction input unit 15.

The web browser conducts communication with the game server 20 in accordance with a hypertext transfer protocol (HTTP). The web browser interprets the HTML data obtained from the game server 20 and displays web pages through the image processing unit 14 on the display unit 16. Further, when either a Hyperlink or a menu on the web page is selected through a user's operation of the instruction input unit 15, the web browser transmits a HTTP request including the selection result to the game server 20 in order to update the web page.

The image processing unit 14 displays a web page on the display unit 16 on the basis of image data for display to be provided from the CPU 11 as an analysis result of the HTML data. For example, the display unit 16 is a liquid crystal display (LCD) monitor including thin-film transistors arranged in a matrix manner on a pixel-by-pixel basis. The display unit 16 displays the image of the web page by driving the thin-film transistors on the basis of the image data for display on a display screen 16a.

When the communication terminal 10 is a button input method communication terminal (see FIG. 2A), the instruction input unit 15 includes a button group 15a that includes a plurality of instruction input buttons such as a directional instruction button and a confirmation button for receiving user operation inputs, and a button group 15b that includes a plurality of instruction input buttons such as a numerical keypad and the like. The instruction input unit 15 also includes an interface circuit for recognizing pressing (operation) inputs of the buttons and outputting the inputs to the CPU 11. For example, the direction instructional button is provided for instructing the CPU 11 to scroll and display a web page displayed on the display unit 16. The confirmation button is provided for instructing the CPU 11 to select one of a plurality of hyperlinks or menus displayed on a web page, which is activated (e.g., highlighted) as a result of a user's selection. When the communication terminal 10 is a small portable terminal, the aforementioned buttons are preferably disposed on the front face of the communication terminal 10 for allowing a user to easily operate (click) the buttons with the thumb of a hand holding the communication terminal 10. In the example represented in FIG. 2A, the button group 15b is arranged below the button group 15a and includes a plurality of instruction input buttons written as "0" to "9", "*", "#" (a numerical keypad).

When the communication terminal 10 is a touch panel input method communication terminal (see FIG. 2B), the instruction input unit 15 receives touch panel method inputs inputted by mainly touching the display screen 16a with a finger or a pen. The touch panel input method may be a known method such as a capacitance method. As represented in FIG. 2B, the communication terminal 10 may be provided with a button group 15a despite having the touch panel input method.

When for example the communication terminal 10 is a mobile terminal, a selection operation of a menu on a web page displayed by the communication terminal 10 is conducted by selecting a menu by a pressing operation of the direction instructional button and by confirming the selected menu by a pressing operation of the confirmation button. When for example the communication terminal 10 includes the touch panel input method, the selection operation is conducted by designating (touch operation) with a finger or pen a position of a menu on the display screen 16a in which the web page is displayed.

(3) Game Server Structure

The structure of the game server 20 will be explained with reference to FIG. 4.

For example, the game server 20 manages a website of a game including a plurality of hierarchically structured web pages. The game server 20 provides a web service of the game to the communication terminals 10. As represented in FIG. 4, the game server 20 includes a CPU 21, a ROM 22, a RAM 23, a database (DB) access unit 24, a communication interface unit 25, and an application programming interface (API) server 26. Further, the game server 20 includes a bus 27 for transmitting control signals or data signals among the components. It should be noted that the game server 20 may have the same hardware structure as general-purpose web servers.

The ROM 22 stores an application program that provides the service of displaying a HTML document and objects such as images (i.e., displaying a web page) to the web browser of the communication terminal 10 as a client. A variety of data that can be referenced by the CPU 21 is stored in the ROM 22 in addition to the application program.

The CPU 21 loads a game program stored in the ROM 22 into the RAM 23 and executes the loaded game program and also executes a variety of processes through the communication interface unit 25.

For example, the CPU 21 conducts communication in accordance with HTTP with the web browser of the game server 20 through the communication interface unit 25. For example, the CPU 21 conducts certain data processing and computation processing on the basis of a HTTP request (e.g., including a user hyperlink or menu selection result on a web page) received from the communication terminal 10 through the communication interface unit 25. The CPU 21 sends back a HTTP response that includes the processing results to the web browser of the game server 20. HTML data for updating the web page is included in the HTTP response. Moreover, the CPU 21 conducts authentication processing when the game server 20 conducts authentication processing of the user of the communication terminal 10.

The database access unit 24 is an interface for when the CPU 21 conducts data reading and data writing with respect to the database server 30.

The API server 26 is embedded with a web API and conducts communication in accordance with HTTP with an API server of another game server. For example, the API server 26 is configured to use HTTP to request an API server of another game server to conduct certain processing. The API server that receives the request returns the processing result to the API server 26 that is the source of the request. In the present embodiment, the API server 26 makes a request to obtain user information when obtaining the user information of a specific user about a game being executed on another game server.

Figure 4:
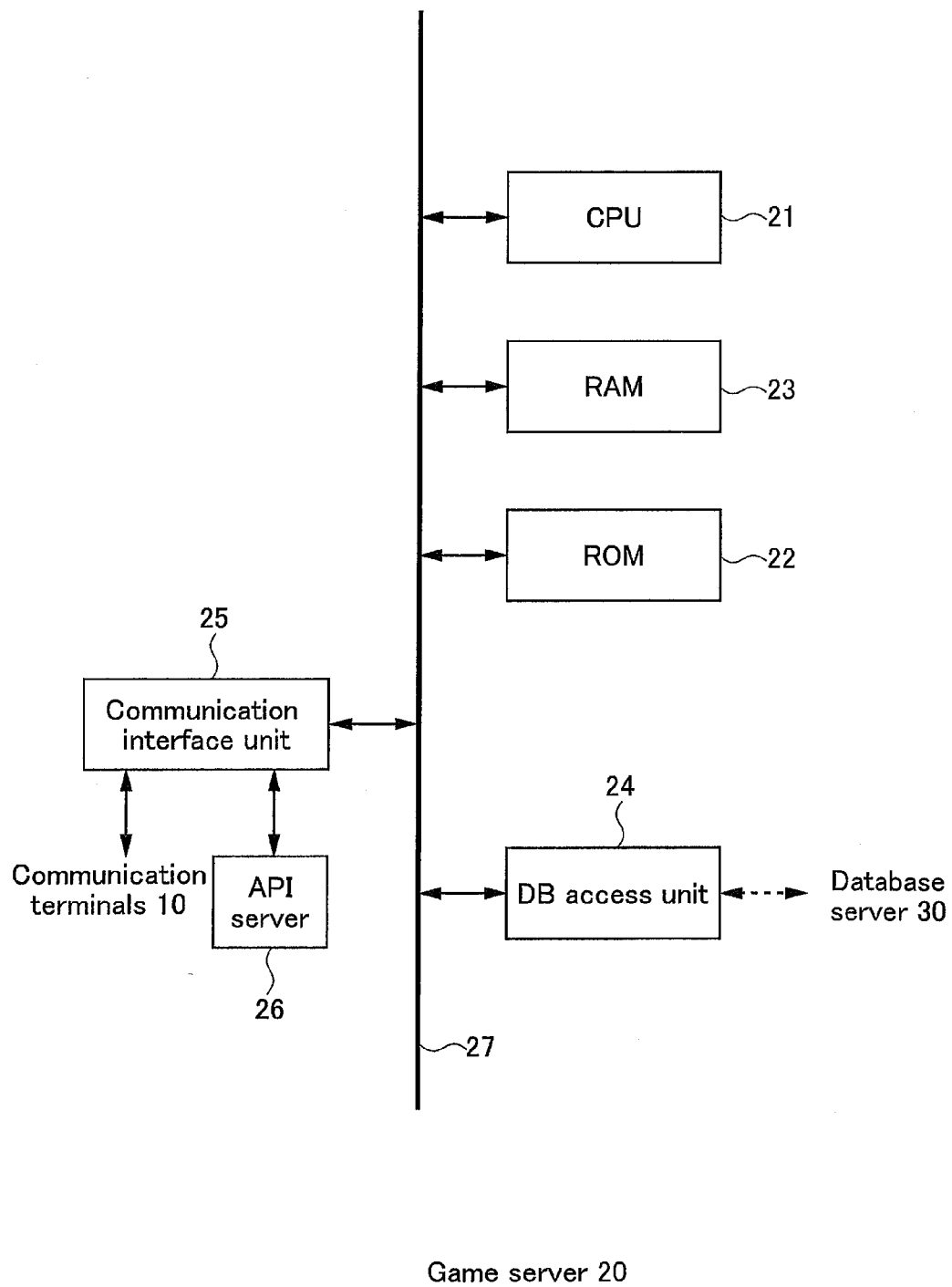
FIG. 4 is a configuration block diagram of a game server according to the first embodiment.

Although the API server 26 is represented as being incorporated in the game server 20 in FIG. 4, the API server 26 may be configured separately from the game server 20.

(4) Database Server Structure

The database server 30 can be realized by a general-purpose storage such as a high-capacity hard disc drive, redundant arrays of inexpensive disks (RAID), or other form of device. Databases inside the database server 30 are configured to allow reading and writing of data by the CPU 21 through the database access unit 24 of the game server 20.

Figure 5:
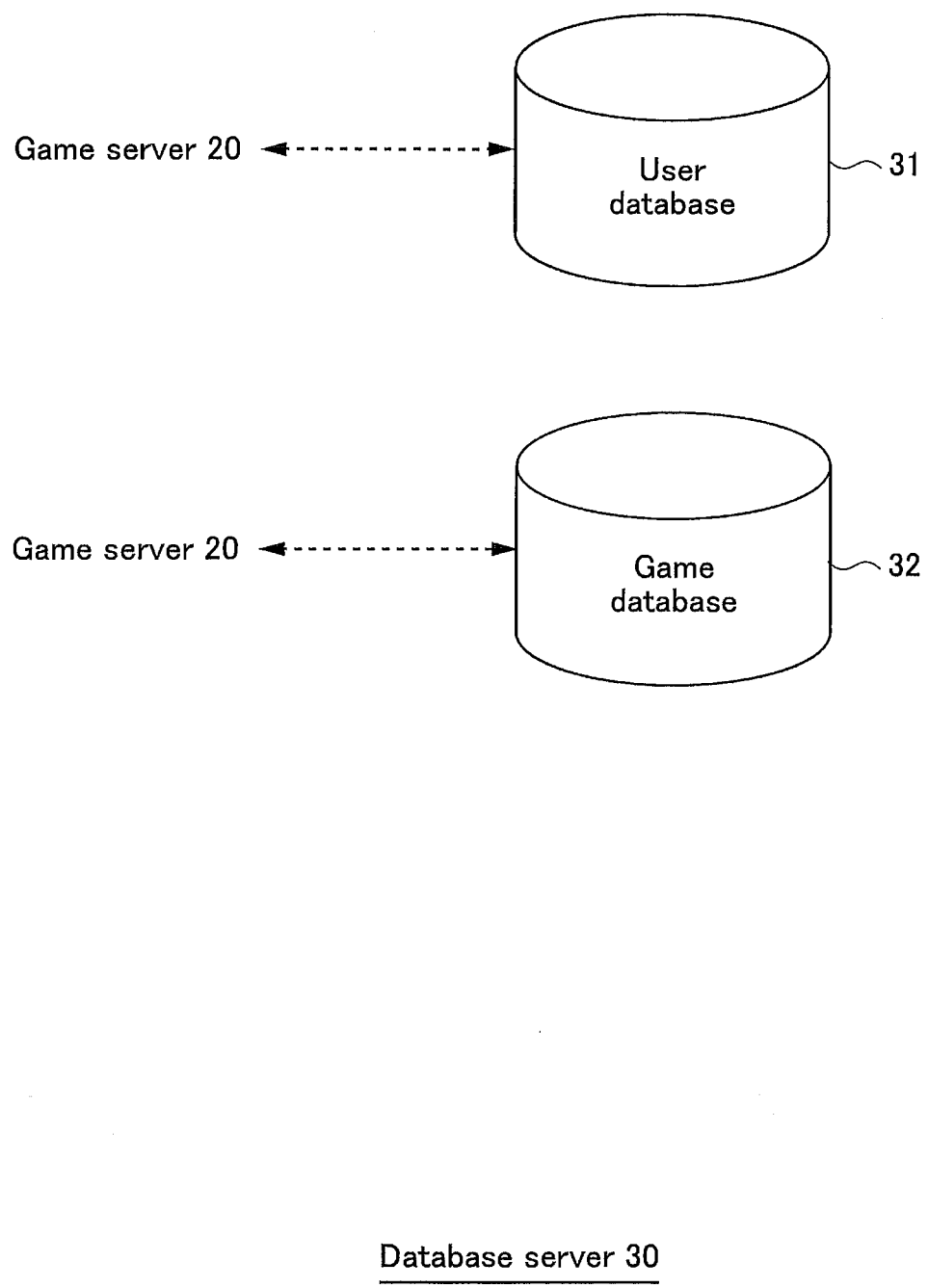
FIG. 5 is a configuration block diagram of a database server according to the first embodiment.

Although the construction of the database server 30 differs depending on the game to be processed, all of the database servers 30 are assumed to include the common structure represented in FIG. 6 in order to simplify the explanation. As represented in FIG. 5, the database server 30 includes a user database 31 and a game database 32.

Although the type of game realized by the game server 20 of the present embodiment is not limited in particular, to conveniently describe the embodiments hereinbelow, a digital card game that uses cards in which game character images are displayed will be used as an example of a game realized by the game server 20. Namely, the game servers 20a, 20b, and etc. respectively execute a game A, a game B and the like that are digital card games.

FIG. 6 represents an example of the user database 31 applied to a digital card game (referred to hereinbelow for convenience as a "game" or a "game of the present embodiment") of the present embodiment. In the example, the user database 31 includes, for each user ID (user identification information), information represented in the fields of a user name, a progress level, power points, an experience value, user IDs of friends, owned cards, and owned items. The information included in the user database 31 may be updated successively by the game server 20.

In the following explanation, the user IDs or data for each user name that specifies a user included in the user database 31 will be collectively referred to as "user data." The data of the fields that configure the user data are described below.

In the game system of the present embodiment, the plurality of game servers 20a, 20b, 20c and etc. are embedded in a common platform, and the same users are managed with the same user IDs in the plurality of games A, B, C, and etc.

User Name

The user name is the name of a user displayed for specifying a user of the communication terminal 10 when executing the game. The user name is text equal to or less than a certain length and designated by the user beforehand. The user name may be managed as the same user name by the same user in the plurality of games A, B, C, and etc. in the same way as the user ID, or may be allowed to be set as a different user name for each game.

Progress Level

The progress level is data that indicates a progress level of the user in each game. For example, a range of level values is from level 1 (Lv1) to level 100 (Lv100). The progress level increases by one when the experience value reaches a certain value.

Power Points

A power point is a point that is required for performing a quest described below in the game of the present embodiment. The power point is a value that decreases while performing the quest and is restored (increases) each time a certain period of time elapses. The power point does not become a negative value.

Experience Value

An experience value is a value that increases when performing a quest described below in the game of the present embodiment. When the experience value reaches a certain value (e.g., 100), the progress level increases by one and the experience value is reset (that is, becomes 0).

User IDs of Friends

The user IDs of friends are user IDs having a friend (described below) relationship with the user in the game.

Owned Cards

Owned cards are data (e.g., identifiers that indicate a type of card such as C0 of cards owned by the user in the game. Each card may be associated with a parameter (namely, an ability value such as an attack strength or defense strength), for example, that is referred to in a battle and the like in the game.

Owned Items

Owned items are data (e.g., an identifier and the like that indicates an item type such as "Im1") of items owned by the user in the game.

Returning to FIG. 5, the game database 32 stores and updates information related to the progress of a game executed by the game server 20 on the basis of accesses from the game server 20. The information related to the game progress may include a variety of information based on the characters of the game, and includes, for example, information about the result of a quest described below.

(5) Game of Present Embodiment

Figure 7:
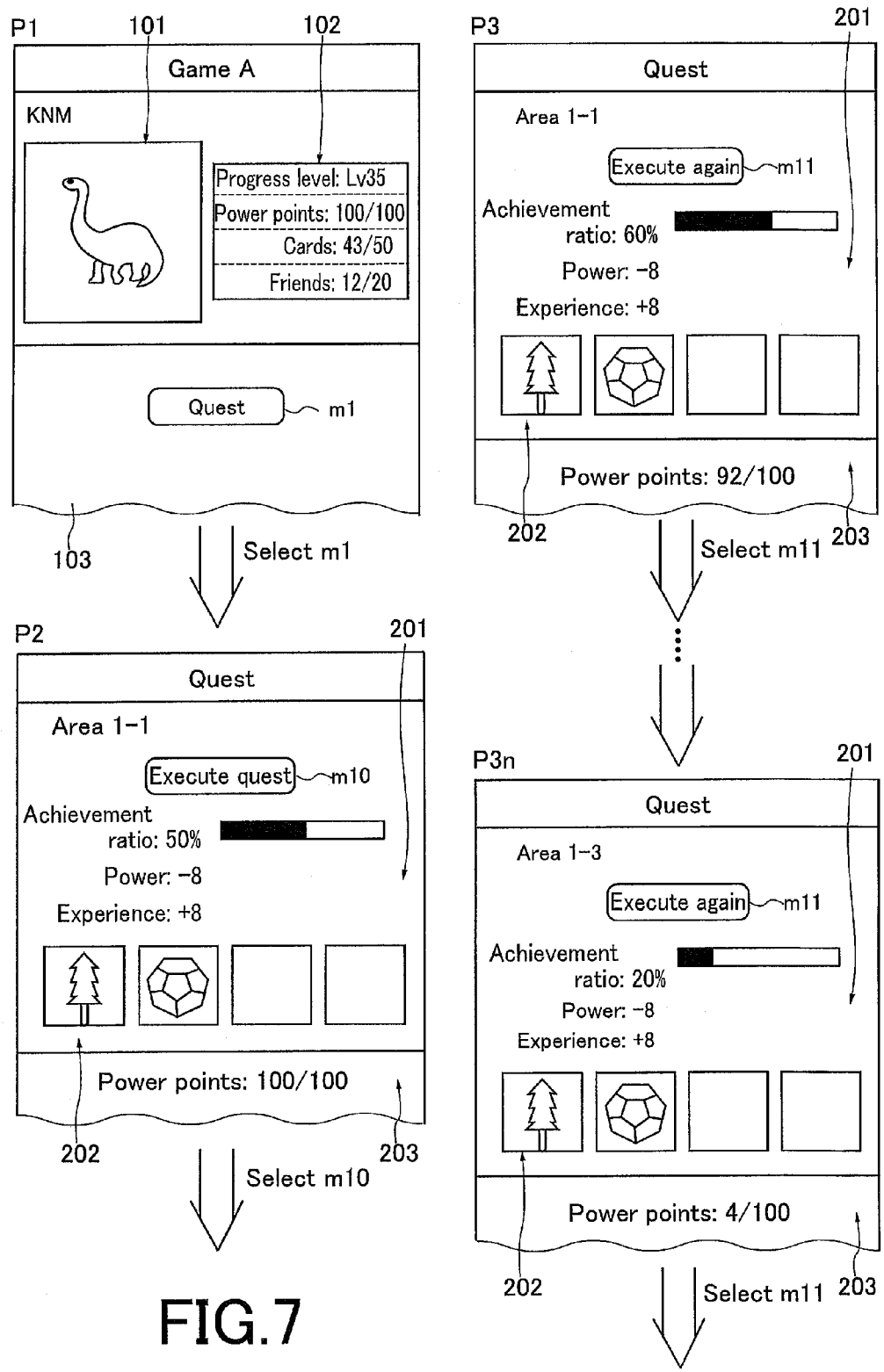
FIG. 7 is an exemplary diagram of a series of web pages displayed on a user's communication terminal.
Figure 8A:
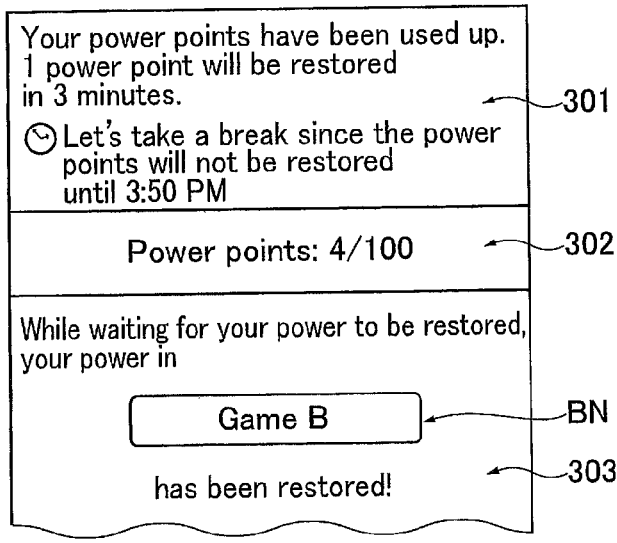
FIGS. 8A and 8B are exemplary diagrams of web pages displayed on a user's communication terminal.
Figure 8B:
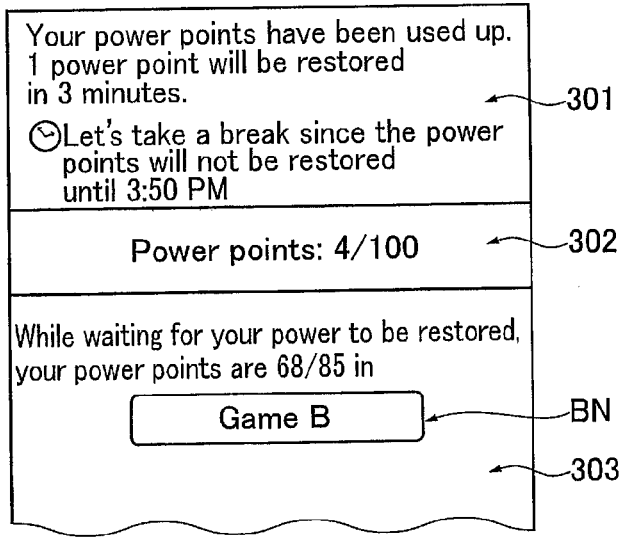

Hereinbelow, the game of the present embodiment will be explained with reference to FIGS. 7, 8A, and 8B. FIG. 7 is an example of a series of web pages when the user is performing a quest in the game A of the present embodiment. FIGS. 8A and 8B are examples of web pages when the progress of the user in the game A is hampered.

In the following explanation, marks and menus and the like displayed on the web pages displayed by the communication terminal 10 are arranged in desired positions on the web pages. The positions on the display screen of the menus and marks and the like made visible by the communication terminal 10 may be changed by a scrolling operation of the web page based on a direction instructional button or touch panel operation by the user.

A web page P1 in FIG. 7 is an example of a top page of the game A of the present embodiment and is configured in accordance with individual user IDs. The example in FIG. 7 includes a character image display area 101, a user data display area 102, and a menu display area 103.

The character image display area 101 is an area that displays a character image that is previously designated by the user from character images corresponding to a plurality of cards included in the user data of the applicable user ID.

The user data display area 102 is an area in which data of fields (see FIG. 6) of the progress level, the power points, the cards, and friends included in the user data of the applicable user ID. The number of cards owned by the user is displayed under "Cards" in the user data display area 102. As represented in the example in FIG. 7, the number of cards described as "43/50" indicates that the number of cards owned by the user is 43 and the maximum number of cards that can be owned is 50. The power points described as "100/100" indicates that the user currently has 100 power points and that the maximum amount of power points of the user at the current time is 100. The number of friends of the user is displayed under "Friends" in the user data display area 102. As represented in the example in FIG. 7, the number of friends described as "12/20" indicates that the current number of friends of the user is 12 and that the number of friends that can be registered by the user at the current time is 20.

The menu display area 103 is an area that displays a menu corresponding to a plurality of functions provided in the game A of the present embodiment. Herein the display of a menu m1 in which the text "Quest" is written is displayed as an example of a menu. However, the menu is not limited as such and a menu for executing other processing may be appropriately displayed. For example, a menu "battle" for executing a battle with another user and that uses the cards may be displayed.

When the menu m1 "Quest" is selected on the web page P1 in FIG. 7, the web page is updated as represented in P2. A menu m10 ("Execute quest") for the user to search in a certain area in the game is included in the web page P2. When the menu m10 is selected, the web page is updated as represented by P3. A menu m11 ("Execute again") is displayed in the web page P3 in order to continue the searching. A value of an achievement ratio increases by a fixed or a random increase amount when the menu m10 or the menu m11 is selected, and the searching area is completed when the achievement ratio reaches 100% and the user is able to progress to the next area. Only a certain amount ("8" in the example in FIG. 7) of the power points of the user is consumed and only a certain amount ("8" in the example in FIG. 7) of the experience value of the user increases when the menu m10 or the menu m11 is selected. The area to be searched may be provided as a plurality of areas. When the menu m10 or the menu m11 is selected, the quest processing may be configured to allow the user to obtain various prepared items or cards in the game with a fixed or a random probability. The obtained cards and items are displayed for example in a display area 202 of the web page.

The power points are consumed (reduced) by only a certain amount when executing the quest and a point display area 203 is provided for displaying the power points held by the user after the reduction. For example, when switching from the web page P2 to P3, it can be seen that the power points are reduced from "100" to "92". The selection operation of the menu m11 in the web page P3 is continued until the quest cannot be executed any further since, as represented in a web page P3n for example, the power needed for one quest (e.g., "8") will be consumed when the power points become depleted (e.g., "4"). As described above, since the power points are restored (increased) by a fixed amount for every fixed period of time, in the state of the web page P3n, the user is required to wait a certain amount of time to be able to adequately execute the quest of the game A again.

In the game system of the present embodiment, the web page is updated as represented by P4 in FIG. 8A or 8B when the menu m11 in the web page P3n is selected. The web page P4 is provided with a text display area 301, a point display area 302, and a guiding area 303. A text is included in the text display area 301 that notifies the user the fact that the quest of the game A cannot be executed for a while since the power points are insufficient. The current power points of the user are displayed in the point display area 302 in the same way as in the point display area 203 in FIG. 7. Since the quest is not executed at this time, the display contents of the point display area 302 are the same as those of the point display area 203 of the web page P3n.

Information about the power points of the same user with respect to a game B and a banner BN for starting the execution of the game B are displayed in the guiding area 303 as an example of user information about the game B that is another game. The banner is an example of an operating target of the present invention.

The web page P4 in FIG. 8A represents an example when the power points of the user for the game B are completely restored (that is, when the power points of the user equal the maximum value of the power points of the user at the current point in time). The web page P4 in FIG. 8B displays a specific value of the power points of the user for the game B when the power points are in the middle of being restored (the example in FIG. 8B indicates that the power points have been restored to "68" while the maximum value is "85").

Although FIGS. 7, 8A, and 8B represent examples in which the power points of the user (user information) and the banner BN for starting the game B in relation to the game B are displayed at a timing in which the user has started executing the game A and the game progress is hampered, the present invention is not limited to this example. For example, the power points of the user in relation to the game B may be displayed when the power points of the user become equal to or less than a certain value.

(6) Overview of Functions of Game Control Device

The following is an explanation of functions of the game control device for realizing the abovementioned game of the present embodiment.

In the present embodiment, the game control device of the present invention is configured, for example, by the game server 20 and the database server 30. Hereinbelow, an example of the game server 20a and the database server 30a that execute the game A with respect to the functions realized by the game control device of the present embodiment will be described with reference to FIG. 9 as an example applicable to the abovementioned game of the embodiment. The other game servers 2b, 20c, and etc. and database servers 30b, 30c, and etc. are the same.

Figure 9:
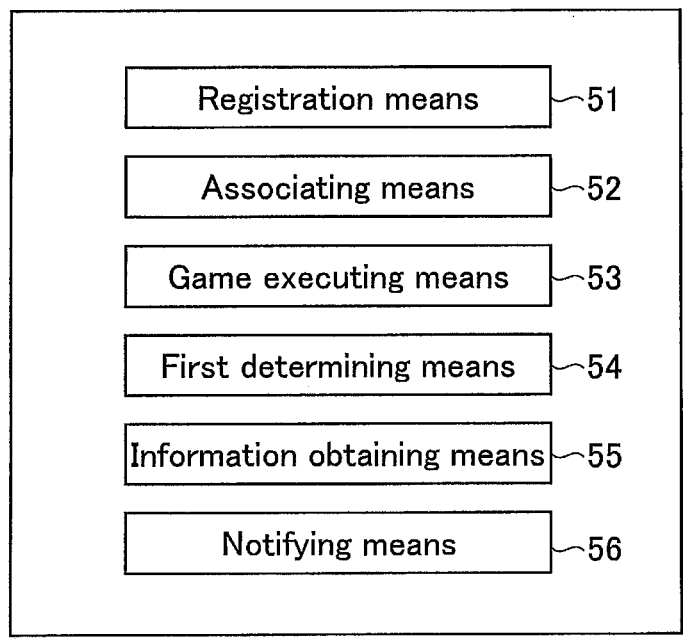
FIG. 9 is a functional block diagram for explaining functions fulfilling main roles in a game control device according to the first embodiment.

FIG. 9 is a functional block diagram for explaining functions fulfilling main roles in a game control device according to present embodiment. A registration means 51 and an associating means 52 are not required constituent elements of the present invention, but are preferred constituent elements in the game control device of the present embodiment.

The registration means 51 includes functions to recognize a user registration request, for example, on the basis of information related to a suitable operation input to the communication terminal 10 on a web page provided to the communication terminal 10, and to conduct registration processing. The registration processing is conducted when the user conducts a user registration in the game of the present embodiment.

The functions of the registration means 51 are realized for example as described below. The CPU 21 of the game server 20a receives a registration request message from the communication terminal 10 through the communication interface unit 25. The registration request message may be automatically created by a certain operation (e.g., a selection of a certain menu, a user ID designated by the user, or a text input such as a password) in the communication terminal 10 on a web page provided by the game server 20a so that a web page is configured. Information (e.g., an email address, or unique identification information of the terminal such as a unique identifier (UID)) for specifying the communication terminal 10 that is the transmission source may be included in the registration request message. Alternatively, when the user is already using another game from the same service provider, the registration request message may include the user ID of the user.

The CPU 21 receives the registration request message and when a user ID is not included in the registration request message, the CPU 21 issues a new user ID and processes the new user ID, and then transmits a message to the communication terminal 10 indicating the fact that the registration processing is completed. The CPU 21 receives the registration request message and when a user ID is included in the registration request message and after processing the user ID, the CPU 21 transmits the registration completion message to the communication terminal 10 indicating that the registration processing is completed. The registration processing includes the CPU 21 creating user data corresponding to the user ID and storing the user data in the user database 31. When the registration is completed, the user is able to execute the game of the present embodiment. After completing the registration, upon receiving a HTTP request for logging in from the communication terminal 10 of each user, the CPU 21 and obtains the unique identification information, or the user ID and the password from the HTTP request and verifies the unique identification information or the user ID and the password with, for example, registered data in the user database 31 to conduct the authentication processing.

The associating means 52 has a function for associating different users. Namely, the associating means 52 records a user ID and another user ID in association with each other when, for example, an application occurs on the basis of those user IDs. Specifically, the associating means 52 records the other user ID (that is, the other user) as "friend" when the application occurs on the basis of the user ID.

The functions of the associating means 52 are realized for example as described below. The CPU 21 of the game server 20a receives an application message (friend application) that specifies a user ID (or the corresponding user name) that the user desires be friends with from the communication terminal 10 of the user corresponding to the user ID through the communication interface unit 25. The transmission of the application message may be previously set as a function of the web page provided to the communication terminal 10 of the user.

Upon receiving the application message, the CPU 21 transmits HTML data for displaying a web page to request a reply for acknowledging the application on the basis of the other user ID, to the communication terminal 10 corresponding to the user ID when there is an access based on the user ID included in the application message. The CPU 21 registers both users as friends if the acknowledgment of the application is returned. Specifically, the CPU 21 writes data (partner user IDs) in the "Friend user IDs" location of the user data of the two corresponding user IDs in the user database 31. The CPU 21 may register both users as friends upon the users conducting a certain operation during the execution of the game if the acknowledgment of the users prior to the friend application is not necessary.

A game executing means 53 includes a function to execute the game A.

The execution of the game A in the present embodiment is achieved by transmitting HTML data for successively updating web pages displayed on the communication terminal 10 in response to operations by the user on the communication terminal 10. The CPU 21 of the game server 20*a* receives a HTTP request from the communication terminal 10 through the communication interface unit 25, executes the processing requested by the HTTP request, and sends a HTTP response that includes HTML data that is the execution result back to the communication terminal 10.

The execution contents of the processing requested by the HTTP request may differ according to the functions provided in the game, but for example are as follows.

For example, when executing a request described in relation to FIG. 7, the CPU 21 of the game server 20*a* conducts processing to update the user achievement ratio, the power points, and the experience value to be processed upon receiving a HTTP request that includes certain selection operation contents (e.g., selection operation results of the menus m10 or m11) selected by the user. The CPU 21 may transfer the data of the achievement ratio, the power points, and the experience value of the user to the RAM 23 from the time of the quest execution start (the time the menu m1 is selected), may conduct the update processing of the data in the RAM 23 during the quest, and may overwrite the data in the database server 30 with the data after the updating in the RAM 23.

For example, when executing a battle with another user using cards, the CPU 21 of the game server 20*a* may compare the values of parameters (e.g., values for attack strength and defense strength and the like) of the cards used in the battle of the users subject to the battle, and may decide the outcome of the battle on the basis of the results of the comparison.

A first determining means 54 has a function for determining whether an execution state of the game A (first game) by the user satisfies a first condition. In the present embodiment, the first condition, for example, may satisfy when the power points in the game A being executed by the user equals or falls below a certain value, and the user cannot execute the quest any further.

In order to realize the functions of the first determining means 54, the CPU 21 of the game server 20*a* conducts processing to update the power points as described above upon receiving a HTTP request that includes certain selection operation contents (e.g., selection operation results of the menus m10 or m11) selected by the user. The processing includes comparing the power points of the user and the power points required to execute the quest to determine that the first condition is satisfied when the power points of the user are less (the power points cannot be reduced since they will become a negative value). For example, when the user's power points are "6" and when "8" power points are required to execute the quest once, the power points cannot be reduced and thus the first condition is satisfied.

Although not represented in FIG. 9, the game control device of the present embodiment may include a state obtaining means for obtaining an execution state of the user in the game A (first game). Although the CPU 21 of the game server 20*a* reads and obtains the power points of the user from, for example, the user data of the user to be processed for comparing the power points of the user with the power points required for executing the quest, the processing to obtain the power points by the CPU 21 is one example of implementation of the state obtaining means functions.

An information obtaining means 55 includes a function to obtain user information of a user in any of games B, C and etc. (second game) that differs from the game A (first game) from another game server (device) executing any of the games B, C and etc. (second game) when the first condition is determined by the first determining means 54 to be satisfied.

The user information may be power points in the example of the game of the present embodiment. The game subject to the obtaining of the user information may be decided beforehand. For example, when the game subject to the first condition determination is the game A, the game from which the user information is obtained (second game) may be decided beforehand as the game B.

The functions of the information obtaining means 55 can be realized as described hereinbelow. When, for example, the game B is decided beforehand as the game from which the user information is obtained, the CPU 21 of the game server 20*a* controls the API server 26 of the game server 20*a* to send a request for obtaining power points (example of user information) of the game B of the user subject to the processing to the API server 26 of the game server 20*b* that is the server executing the game B. In response to the request from the API server 26 of the game server 20*a*, the API server 26 of the game server 20*b* returns, to the API server 26 of the game server 20*a*, a response that includes the power point value in the game B of the user subject to the processing and that is stored in the user database 31 of the database server 30*b*. After this processing is completed, the CPU 21 of the game server 20*a* obtains the power points of the game B of the user subject to the processing.

The information obtaining means 55 may refer to a storage device that stores information related to the associations between different games to specify the game B, C, and etc. (second game) as the game associated with the game A (first game), and may obtain the user information of the user of the second game. That is, the game from which the user information is obtained by the information obtaining means 55 may be a game associated with the game A (first game). In this case, a table for describing the relationships between a game and games associated with that game is provided in the game database 32, as represented in the example in FIG. 10A, so that the CPU 21 can decide the game from which to obtain the user information by accessing the table. For example, in the example in FIG. 10A, since the game B and the game E are included in the games associated with the game A, the CPU 21 of the game server 20*a* selects a game from which the user information is to be obtained with the same probability among the game B and the game E, or selects any of the games with a probability in accordance with a level of association with the game A. In this way, by selecting a game associated with the game A (first game) as the game from which the user information is to be obtained, the user can be effectively guided from the game A to a game selected since, for example, a game with the same acceptability as the game A, or a game with a high level of similarity in the game structure as the game A is selected.

A storage device for storing the table represented in FIG. 10A, that is, the information concerning the associations between different games may be the abovementioned game database 32, or may be provided in a storage or an external storage device connectable through a network.

In another aspect, the information obtaining means 55 may refer to a storage device that stores information concerning the associations between games and a user to specify the game B, C, and etc. (second game) as the game associated with the user, and may obtain the user information of the user of the second game. That is, the game from which the user information is obtained by the information obtaining means 55 may be a game associated with the user subject to the processing. In this case, a table for describing the relationships between a user and games associated with that user is provided in the game database 32, as represented in the example in FIG. 10B, so that the CPU 21 can decide the game from which to obtain the user information by accessing the table. For example, in the example in FIG. 10B, since the games A, B, and F are included in the games associated with a user KNM (user ID: 000001), the CPU 21 of the game server 20a selects a game from which the user information is to be obtained with the same probability among the game B and the game F, or selects any of the games with a probability in accordance with a level of association with the user. The CPU 21 of the game server 20a may obtain from another server through the API server 26, for example, progress levels of games or frequencies of log-ins and the like of a user in order to decide games associated with the user and a degree of association between the games and the user. In this way, by selecting a game associated with the user subject to the processing as a game from which the user information is obtained, the user can be effectively guided from the game A to a selected game since, for example, a game that the user has frequently executed or a game with a high level of progression by the user is selected.

A storage device for storing the table represented in FIG. 10B, that is, the information concerning the associations between the user and the games may be the abovementioned game database 32, or may be provided in a storage or an external storage device connectable through a network.

A notifying means 56 includes a function for notifying the user about user information of any of the games B, C, and etc. (second game) obtained by the information obtaining means 55.

When the information obtaining means 55 obtains the power points (user information) of the game B for example, in order to realize the functions of the notifying means 56, the CPU 21 of the game server 20a obtains the power points of the game B of the user subject to the processing from the game server 20b and transmits, for example, HTML data including the power points of the game B to the communication terminal 10 of the user in response to a HTTP request that includes certain selection operation contents (e.g., result of selection operation of the menu m10 or m11) by the user. Consequently, a web page that includes the power points of the game B is displayed on the communication terminal 10 of the user. In addition to the power points of the game B, a banner for starting the execution of the game B is preferably included in the HTML data transmitted to the communication terminal 10 of the user.

Figure 11:
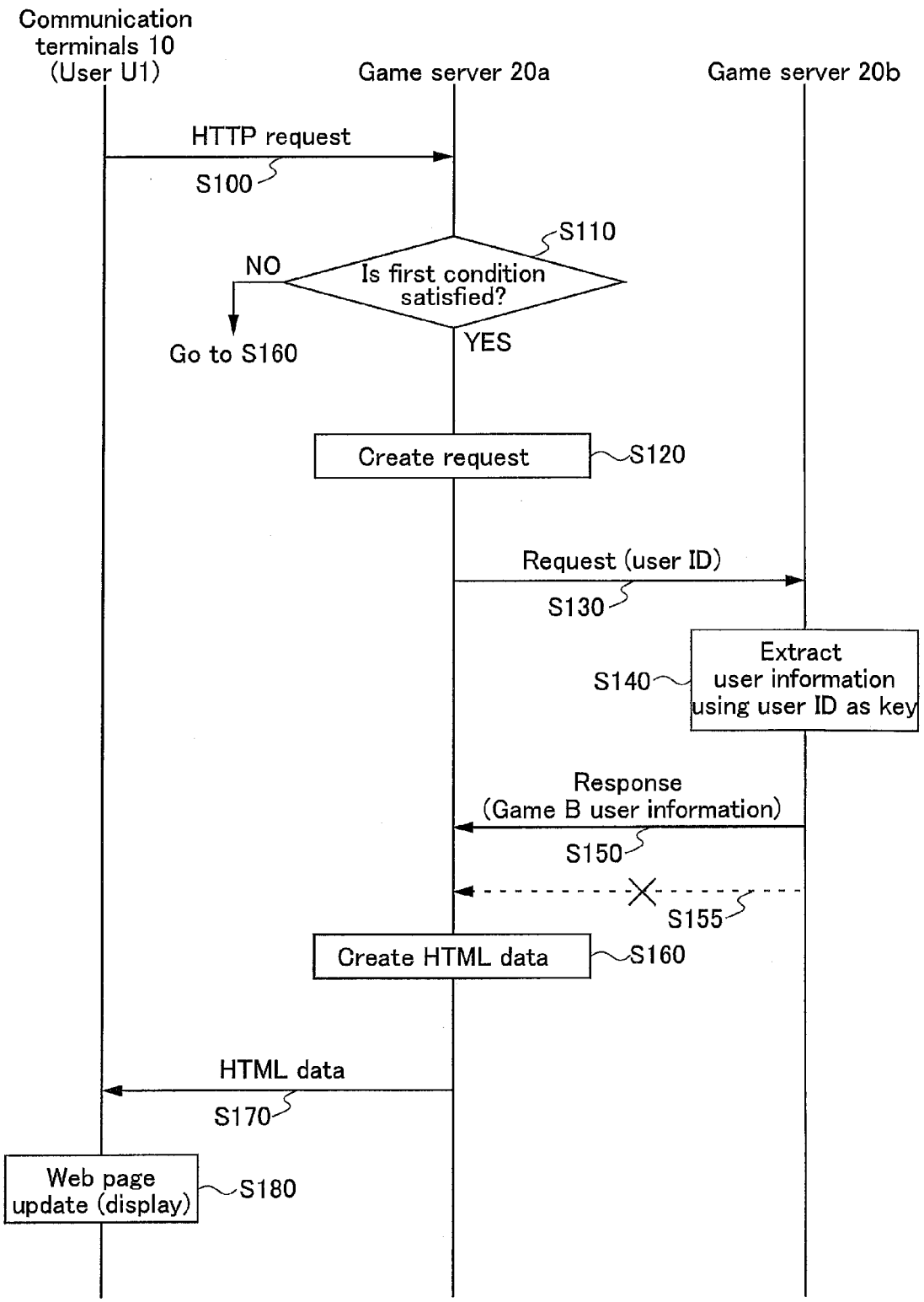
FIG. 11 is a sequence chart representing an example of processing for exhibiting information about a game different from the game that is being executed to a user in the game control device according to the first embodiment.

(7) Main Processing Flow of the Game Control Device of the Present Embodiment Next, an example of a main processing flow conducted by the game system according to the present embodiment will be explained with reference to the sequence chart in FIG. 11. The sequence chart in FIG. 11 is an example in which the user is executing the game A and the user information is to be obtained from the game B.

For example, a case is assumed in which a specific user U1 repeatedly executes a quest. The CPU 11 of the communication terminal 10 transmits a HTTP request including a selection operation result of the menu m11 to the game server 20a due to the selection, operation of the menu m11 (see FIG. 7) by the user U1 (step S100). The CPU 21 of the game server 20a receives the HTTP request of step S100 and performs processing to update the achievement ratio, the power points, and the experience value of the user U1 subject to the processing. Here, it is determined that the first condition is satisfied in the processing when the power points cannot be reduced (step S110: YES). If the power points can be reduced (step S110: NO), the routine advances to step S160 to create HTML data for displaying the power points and the like after updating (step S160).

When the first condition is determined to have been satisfied in step S110, the CPU 21 of the game server 20a controls the API server 26 of the game server 20a to create a request for obtaining power points (example of user information) of the game B of the user U1 subject to the processing from the API server 26 of the game server 20b that is the server executing the game B (step S120). As a result, the above request is sent from the API server 26 of the game server 20a to the API server 26 of the game server 20b (step S130). The user ID of the user U1 subject to the processing is included in the request. The CPU 21 of the game server 20b that receives the request extracts the power points as user information from the user data using the user ID subject to the request as a key (step S140). The API server 26 of the game server 20b returns, to the API server 26 of the game server 20a, a response that includes the value of the power points (user information) in the game B of the user U1 subject to the processing (step S150).

The CPU 21 of the game server 20a obtains the power points of the game B of the user U1 subject to the processing from the game server 20b, creates HTML data including the power points of the game B in response to a HTTP request of the step S100 (step S160), and transmits the HTML data to the communication terminal 10 of the user U1 (step S170). Consequently, a web page of the game A is updated on the communication terminal 10 of the user U1 (step S180). The power points of the game B are included in the updated web page of the game A. When the response of step S150 is received, a banner for starting the execution of the game B is preferably included in the HTML data created in step S160.

If the CPU 21 of the game server 20a cannot obtain the power points of the game B of the user U1 subject to the processing from the game server 20b (step S155 instead of step S150), the CPU 21 creates HTML data including the banner for starting the execution of the game B in response to the HTTP request in step S100 (step S160), and transmits the HTML data to the communication terminal 10 of the user U1 (step S170). Consequently, the web page of the game A is updated on the communication terminal 10 of the user U1 (step S180). Although the power points of the game B of the user U1 are not displayed in the updated web page of the game A, the banner for starting the execution of the game B is displayed.

As described above, in the game control device of the present embodiment, the communication terminal 10 of the user is notified about the power points (user information) in any of the games B, C, and etc. (second game) when the execution condition of the game A (first game) executed by the user satisfies the first condition. As a result, the user executing or about to execute the game A can know the user's own power points for a different game B, C, and etc. (second game), and can appropriately judge whether to progress or execute the different game B, C, and etc. (second game).

In the present embodiment, the first condition can be suitably set. Preferably, as described in the abovementioned embodiment, the first condition may satisfy when at least a portion of the game A (first game) cannot be executed or progressed, such as when the quest cannot be executed due to the power points being insufficient. In this case, the user, for example, can appropriately judge whether any of the different games B, C, and etc. (second game) can be progressed at the point in time when the user cannot progress the game A.

As described above, the user information of the game A (first game) may be the power points. That is, the user information of the game A includes power points (parameters) that fluctuate in accordance with the game progress, and the game A may be a game in which the game progress is hampered when the value of the power points equals or falls below (certain range) the power points required for conducting the request process, and the first condition of the first determining means 54 may be that the value of the power points of the user in the game A (first game) is within the certain range. At this time, the user cannot progress in the game A when the first condition is determined to have been satisfied. Under this state, the user information such as the power points for any of the games B, C, and etc. (second game) different from the game A becomes particularly convenient for the user to allow the user to start another game according to the user information.

As described in the above embodiment, the notifying means 56 may cause user information of a game (second game) different from the game subject to accessing to be displayed on a game screen of the game A (first game) subject to accessing. As a result, user information such as the power points of a game different from the game A can be quickly recognized when accessing the game A, while executing the game A, or when the game A cannot be progressed.

Moreover, as described in the above embodiment, the notifying means 56 may further cause a banner to be displayed for starting the execution of, for example, the different game B (second game). Consequently, the user is able to quickly start the game B. For example, the user is able to switch in a smooth manner from the game A to the game B at the point in time when the game A cannot be progressed.

Second Embodiment

Next, a second embodiment will be explained. The hardware configuration of the elements (the communication terminal 10, the game server 20, and the database server 30) that configure the game system of the present embodiment are the same as those of the first present embodiment. A functional block diagram may have the same functional configuration as that of FIG. 9, but the contents of functions of the first determining means 54 differ from the first embodiment as described below.

While the user information of a different game is notified when the power points of the game A by the user is equal to or less than the power points required to execute the request processing in the first embodiment, the user information of a different game is notified in a state in which the game A (first game) cannot be executed. "A state in which the game A cannot be executed" is a state in which the execution of the game A cannot be started (state in which service for the execution of the game A is stopped) due to maintenance and the like by the game operator of the game A that the user has accessed. Under this state, the user information such as the power points for any of the games B, C, and etc. (second game) different from the game A becomes particularly convenient to allow the user can start another game according to the user information.

The first determining means 54 in the present embodiment has a function for determining whether a game A (first game) state by the user satisfies a first condition. The first condition in the present embodiment is, as described above for example, may satisfy in a case in which the execution of the game A cannot be started due to maintenance and the like by the game operator of the game A that the user has accessed.

In order to realize the functions of the first determining means 54 of the present embodiment, the CPU 21 of the game server 20a receives a HTTP request for logging in from the communication terminal 10 of the user and conducts authentication processing on the basis of unique identification information or a user ID and a password included in the HTTP request. However, if the state in which the game A cannot be executed exists, the CPU 21 determines that the first condition is satisfied. For example, the first condition is satisfied if a state exists in which the execution of the game A cannot be started (state in which service for the execution of the game A is stopped) due to maintenance and the like by the game operator of the game A. Moreover, it is determined that the first condition is satisfied if a state in which the game cannot be executed occurs at a time other than logging in due to maintenance and the like being started while executing the game.

Although not represented in FIG. 9, the game control device of the present embodiment may include a state obtaining means for obtaining a state of the game A (first game). For example, a flag (1: stopped due to maintenance, 0: operating) indicating an operating state of the game A is provided in the game server 20, and when the flag state is set, for example, by the game operator, the CPU 21 of the game server 20a discerns whether the game A is undergoing maintenance by reading the state of the flag. Herein, the above process of reading the state of the flag by the CPU 21 is an implementation example of a function of the state obtaining means.

Similar to the first embodiment, the information obtaining means 55 of the present embodiment may refer to a storage device that stores information related to the associations between different games to specify the game B, C, and etc. (second game) as the game associated with the game A (first game), and may obtain the user information of the user of the second game. That is, the game from which the user information is obtained by the information obtaining means 55 may be a game associated with the game A (first game) or may be a game associated with the user subject to the processing.

In another aspect, the information obtaining means 55 may refer to a storage device that stores information concerning the associations between games and a user to specify the game B, C, and etc. (second game) as the game associated with the user, and may obtain the user information of the user of the second game. That is, the game from which the user information is obtained by the information obtaining means 55 may be a game associated with the user subject to the processing.

Next, an example of a main processing flow conducted by the game system according to the present embodiment will be explained with reference again to the sequence chart in FIG. 11. In the present embodiment, the sequence chart in FIG. 11 is an example in which the user has logged into the game A and the user information is to be obtained from the game B.

In FIG. 11, a HTTP request specifying a uniform resource locator (URL) for a specific user U1 to log into the game A is transmitted to the game server 20a (step S100). When the CPU 21 of the game server 20a receives the HTTP request of step S100, the CPU 21 determines that the first condition is satisfied since the game A cannot be executed due to maintenance (step S110: YES). If the game A is executable (step S110: NO), the routine advances to step S160 and the CPU 21 of the game server 20a refers to the user data of the user U1 and creates HTML data for displaying the top page of the game A of the user U1 (step S160).

When the first condition is determined to have been satisfied in step S110, the CPU 21 of the game server 20a controls the API server 26 of the game server 20a to create a request for obtaining power points (example of user information) of the game B of the user U1 subject to the processing from the API server 26 of the game server 20b that is the server executing the game B (step S120). As a result, the above request is sent from the API server 26 of the game server 20a to the API server 26 of the game server 20b (step S130). The user ID of the user U1 subject to the processing is included in the request. The CPU 21 of the game server 20b that receives the request extracts the power points as user information from the user data using the user ID subject to the request as a key (step S140). The API server 26 of the game server 20b returns, to the API server 26 of the game server 20a, a response that includes the value of the power points (user information) in the game B of the user U1 subject to the processing (step S150).

The CPU 21 of the game server 20a obtains the power points of the game B of the user U1 subject to the processing from the game server 20b, creates HTML data including the power points of the game B in response to a HTTP request of the step S100 (step S160), and transmits the HTML data to the communication terminal 10 of the user U1 (step S170). Text for notifying that the game A cannot be executed due to maintenance is included in the HTML data. When the HTML data is received, a web page of the game A is displayed on the communication terminal 10 of the user U1 (step S180).

Figure 12:
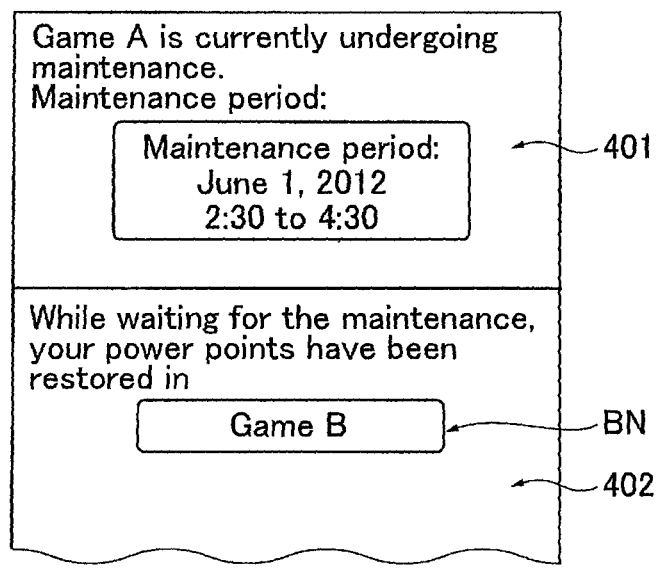
FIG. 12 is an exemplary diagram of web pages displayed on a user's communication terminal according to a second embodiment.

An example of a web page displayed in step S180 is represented in FIG. 12. A display area 401 for notifying the user the fact that the game A is undergoing maintenance, and a guidance area 402 are displayed in the web page exemplified in FIG. 12. The display format of the guidance area 402 in the web page in FIG. 9 is the same as, for example, that of FIG. 8A and preferably includes a banner for starting the execution of the game B.

If the CPU 21 of the game server 20a cannot obtain the power points of the game B of the user U1 subject to the processing from the game server 20b (step S155 instead of step S150), the CPU 21 creates HTML data including the banner for starting the execution of the game B in response to the HTTP request in step S100 (step S160), and transmits the HTML data to the communication terminal 10 of the user U1 (step S170). Consequently, a web page of the game A is displayed on the communication terminal 10 of the user U1 (step S180). Although the power points of the game B of the user U1 are not displayed in the displayed web page of the game A, the banner for starting the execution of the game B is included.

As described above, in the game control device of the present embodiment, the communication terminal 10 of the user is notified about the power points (user information) in any of the games B, C, and etc. (second game) when the condition of the game A (first game) satisfies the first condition (for example, when the game A cannot be executed due to maintenance and the like). As a result, the user about to execute the game A can know the user's own power points for a different game B, C, and etc. (second game), and can appropriately judge whether to progress or execute the different game B, C, and etc. (second game).

Third Embodiment

Next, a third embodiment of the present invention will be explained. The hardware configuration of the elements (the communication terminal 10, the game server 20, and the database server 30) that configure the game system of the present embodiment are the same as those of the first present embodiment.

(1) Overview of Functions of Game Control Device

Figure 13:
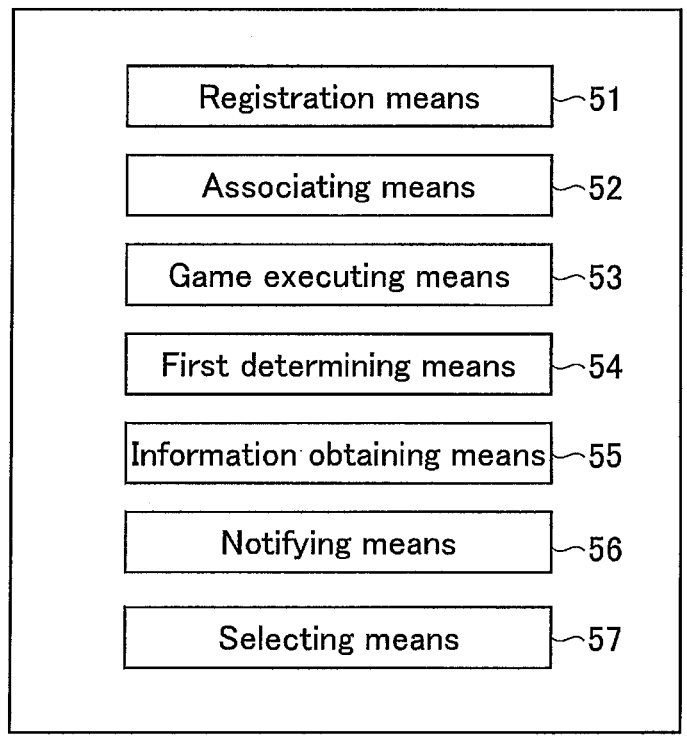
FIG. 13 is a functional block diagram for explaining functions fulfilling main roles in a game control device according to a third embodiment.

A functional block diagram of the game control device of the present embodiment is represented in FIG. 13. As represented in FIG. 13, the present embodiment differs from the first embodiment (FIG. 9) due to the addition of a selecting means 57. The selecting means 57 includes functions for obtaining user registration information from a storage device that stores registration information related to users, referring to the registration information, and selecting one or a plurality of games from any of the games B, C, and etc. (second game) that are different from the game A that is accessed by the user. Herein, the registration information may be information, for example, that indicates an attribute of a user such as the gender or age of the user, and the information related to the gender of the user is particularly preferred.

The location of the storage device for storing the user registration information in the game system of the present embodiment may be set appropriately. For example, the storage device for storing the user registration information may be the database server 30 (user database 31) if the game servers 20 corresponding to the games obtain the registration information on the basis of a selection operation input by the user when user registration is being conducted. Additionally, when a host server (not represented in FIG. 1) connected to the game servers 20 corresponding to the games is provided, and the host server issues a shared user ID that is recognizable by the game servers, and the registration information such as the shared user ID and user attributes is stored in an associated manner in the host server, the storage device for storing the user registration information may be a large capacity storage device such as a hard disk drive (HDD) in the host server.

Figure 14:
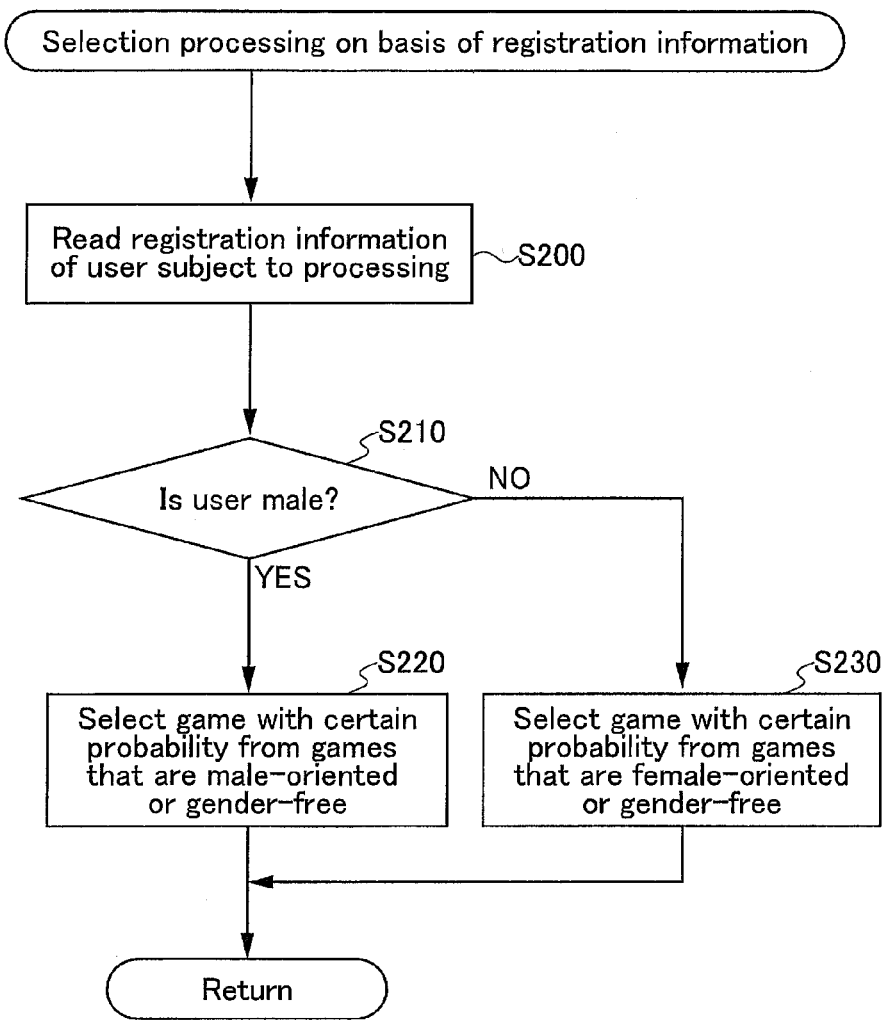
FIG. 14 is a flow chart representing an example of processing for selecting on the basis of registry information in the game control device according to the third embodiment.

An example of a method for realizing the functions of the selecting means 57 will be explained with reference to a flow chart in. FIG. 14. FIG. 14 is a flow chart representing an example of processing for selecting on the basis of registry information. Herein follows an explanation of processing executed by the CPU 21 of the game server 20a in the flow chart in FIG. 14. It is assumed that information related to the gender of the user is included in the user registration information.

If the user registration information is stored in the user database 31, the CPU 21 of the game server 20a accesses the user database 31 and reads the user registration information subject to the processing (step S200). If the user registration information is stored in the host server as described above, the CPU 21 of the game server 20a obtains the registration information by communicating with the host server. In this case, the game servers 20 may periodically (e.g., once a day) receive the user registration information from the host server, or the game servers 20 may send a request for the user registration information to the host server as needed so that the host server returns a response including the user registration information to the game servers 20 in response to the request. In this case, communication between the game servers 20 and the host server may use a Web API based on HTTP.

Next, the CPU 21 of the game server 20a evaluates the information related to the gender of the users included in the registration information. If the user subject to the processing is male (step S210: YES), the CPU 21 of the game server 20a selects a game with a certain probability from a plurality of games that are male-oriented or gender-free (step S220). For example, if the plurality of games that are male-oriented or gender-free consist of the games D, E, and F, the probability of the CPU 21 of the game server 20a selecting a game is exemplified below. However, the probability can also be set arbitrarily.

(When Selecting One Game)
Probability of the game D being selected: 1/3
Probability of the game E being selected: 1/3
Probability of the game F being selected: 1/3

(When Selecting Two Games)
Probability of the games D, E being selected: 1/3
Probability of the games E, F being selected: 1/3
Probability of the games D, F being selected: 1/3

The above example represents a case in which the probability of being selected is the same for the selection candidates, but the present invention is not limited to this case. The probability may be appropriately adjusted so that the probability of a game for preferably guiding (inducing) the user to being selected becomes higher.

If the user subject to the processing is female (step S210: NO), the CPU 21 of the game server 20a selects a game with a certain probability from among a plurality of games that are female-oriented or gender-free (step S230). The selection method is the same as that of the step S220.

In the flow chart represented in FIG. 14, the information related to the gender of the user is assumed to be included in the user registration information, but the user registration information is not limited to the gender of the user. The user registration information may include information related to age. The flow chart for selecting a game in this case may adopt the same configuration as that of FIG. 14. That is, when using a certain threshold as a standard, the CPU 21 of the game server 20a selects a game from a plurality of games for older users or games that do not depend on age when the age of the user is high, or the CPU 21 selects a game from a plurality of games for younger users or games that do not depend on age when the age of the user is lower. The probability of selecting a game may be the same as described above.

(2) Main Processing Flow of the Game Control Device of the Present Embodiment

Figure 15:
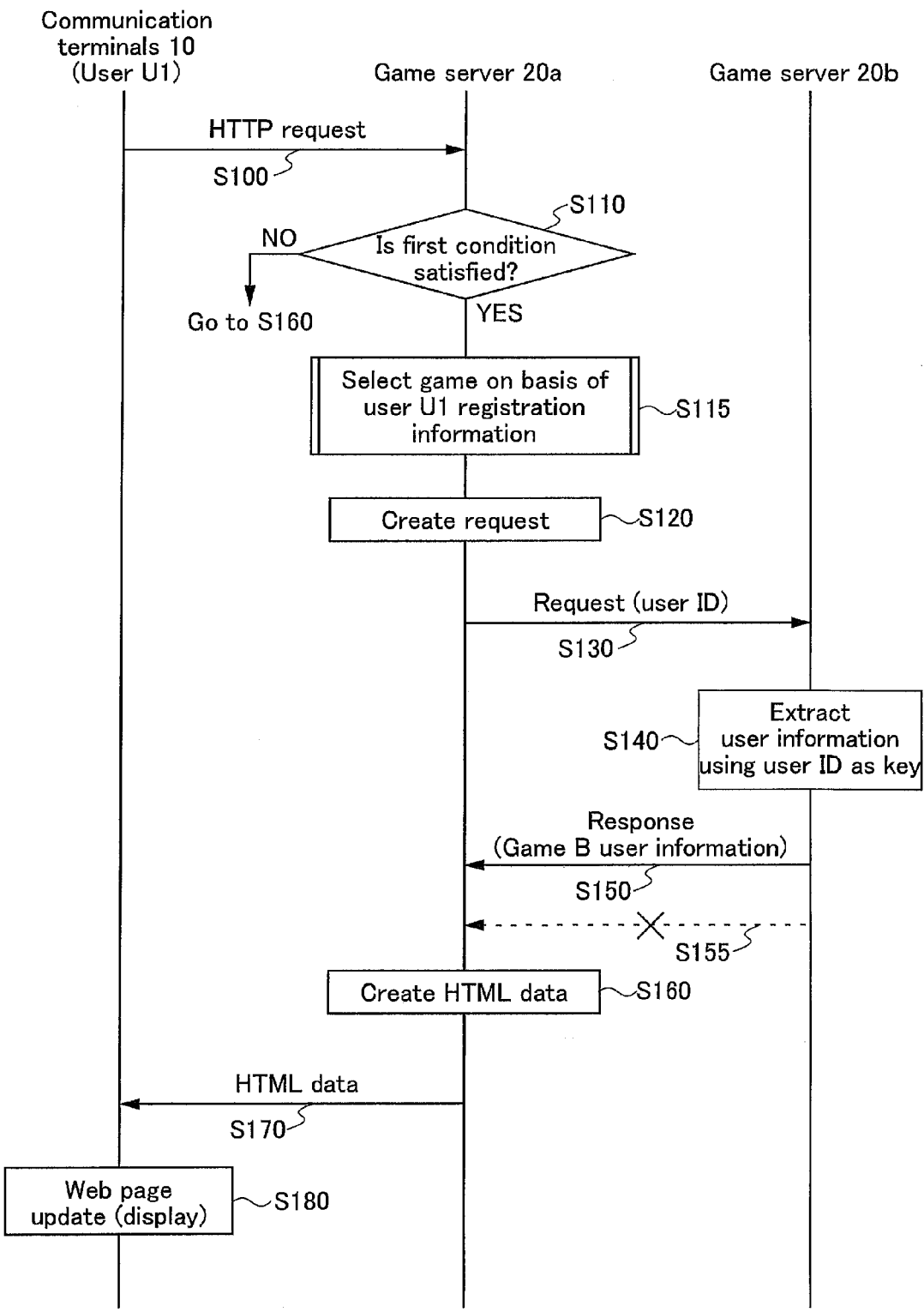
FIG. 15 is a sequence chart representing an example of processing for exhibiting information about a game different from the game that is being executed to a user in the game control device according to the third embodiment.

Next, an example of a main processing flow conducted by the game system according to the present embodiment will be explained with reference to the sequence chart in FIG. 15. FIG. 15 is a sequence chart representing an example of processing for exhibiting, information about a game different from the game that is being played to a user in the game control device according to the present embodiment.

The sequence chart in FIG. 15 is an example in which the user is executing the game A and the user information is to be obtained from the game B in the same way as in FIG. 11. The point of difference with FIG. 11 is that step S115 is added. When the first condition is determined to be satisfied in step S110 in the sequence chart in FIG. 15, the CPU 21 of the game server 20a, for example, selects a game on the basis of the registration information of the user U1 subject to the processing based on the processing represented in FIG. 14 (step S115). It is assumed herein that the game B is selected. In this case, the CPU 21 of the game server 20a controls the API server 26 of the game server 20a to send a request for obtaining power points (example of user information) of the game B of the user U1 subject to the processing to the API server 26 of the game server 20b that is the server executing the game B. The subsequent processing is the same as that of FIG. 11.

In the game system of the present embodiment, a user can be induced to execute a game suited to that user by the game server 20a of the game A (first game) accessed by the user selecting any of the different games B, C, and etc. (second game) on the basis of the registration information of the user. Consequently, the user is able to switch in a smooth manner from the game A to the different game at the point in time when the game A cannot be progressed.

Fourth Embodiment

Next, a fourth embodiment of the present invention will be explained. The hardware configuration of the elements (the communication terminal 10, the game server 20, and the database server 30) that configure the game system of the present embodiment are the same as those of the first present embodiment.

(1) Overview of Functions of Game Control Device

Figure 16:
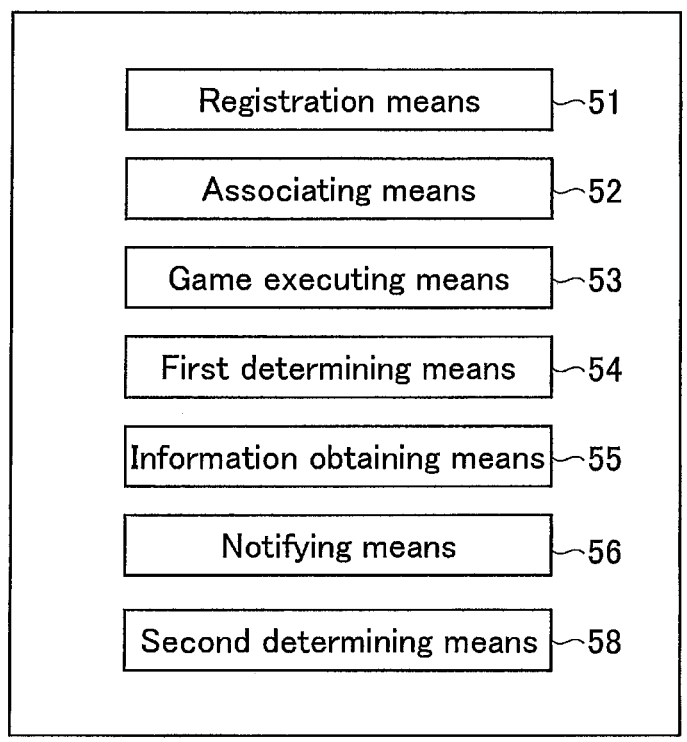
FIG. 16 is a functional block diagram for explaining functions fulfilling main roles in a game control device according to a fourth embodiment.

A functional block diagram of the game control device of the present embodiment is represented in FIG. 16. As represented in FIG. 16, the present embodiment differs from the first embodiment (FIG. 9) due to the addition of a second determining means 58. The second determining means 58 includes the function of determining whether power points (user information) obtained by the information obtaining means 55 of the user for a game that is different from the game accessed by the user satisfy a second condition.

In order to realize the functions of the second determining means 58, the CPU 21 of the game server 20a obtains the power points (user information) of the user for a game different from the game accessed by the user, and determines whether the power points satisfy the second condition. For example, when "8" power points are needed to execute the quest once in the different game and the power points of the user in the different game are "8" or more, the second condition is satisfied since the quest can be executed at least once by consuming the power points.

Although a case in which the game accessed by the user (first game) and the different game (second game) are each configured to conduct quest processing herein, the present invention is not limited as such. The data that is the basis for the first determining means 54 to determine the first condition and the second determining means 58 to determine the second condition may be different since the games themselves may be different and the functions provided in the games may be different.

In the present embodiment, when the second determining means 58 determines that the second condition is satisfied, the notifying means 56 may notify the user about the user's power points (user information) of the game (second game) that is different from the game accessed by the user.

(2) Main Processing Flow of the Game Control Device of the Present Embodiment

Figure 17:
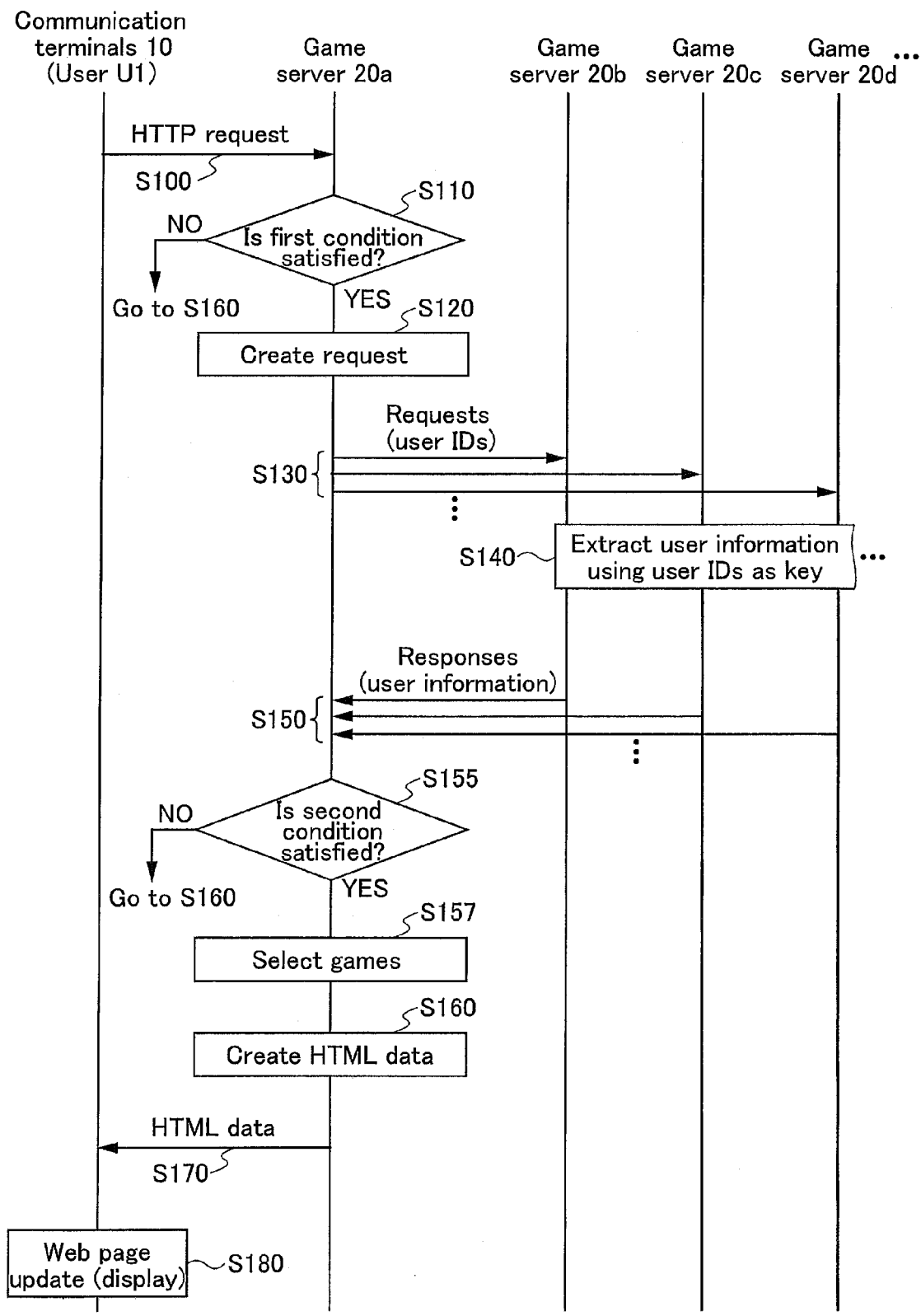
FIG. 17 is a sequence chart representing an example of processing for exhibiting information about a game different from the game that is being played to a user in the game control device according to the fourth embodiment.

Next, an example of a main processing flow conducted by the game system according to the present embodiment will be explained with reference to the sequence chart in FIG. 17. FIG. 17 is a sequence chart representing an example of processing for exhibiting to a user information about a game different from the game that is being played in the game control device according to the present embodiment.

The sequence chart in FIG. 17 is an example in which the user is executing the game A and the user information is to be obtained from the game B in the same way as FIG. 11.

When, in response to the HTTP request (step S100) from the specific communication terminal 10 of the user U1, the first condition is determined to have been satisfied (that is, the quest cannot be executed without the power points being reduced) in step S110, the CPU 21 of the game server 20a executing the game A controls the API server 26 of the game server 20*a* to create a request for obtaining power points (example of user information) of the games B, C, D, and etc. of the user U1 subject to the processing for the API server 26 of the game servers 20*b*, 20*c*, 20*d* and etc. that respectively execute the games B, C, D and etc. (step S120). As a result, the above request is sent from the API server 26 of the game server 20*a* to the API servers 26 of the game servers 20*b*, 20*c*, 20*d* and etc. (step S130). The user ID of the user U1 subject to the processing is included in the request. The CPUs 21 of the game servers 20*b*, 20*c*, 20*d* and etc. that receive the request extract the power points as user information from the user data using the user ID subject to the request as a key (step S140). The API servers 26 of the game servers 20*b*, 20*c*, 20*d* and etc. return a response including the values of the power points in the games B, C, D, and etc. of the user U1 subject to the processing to the API server 26 of the game server 20*a* (step S150).

The CPU 21 of the game server 20*a* obtains the power points of the games B, C, D, and etc. of the user U1 subject to the processing from the game server 20*b*, and determines whether the second condition is satisfied (step S170). For example, if the power points of the user U1 in the games B, C, D, and etc. are equal to or greater than the power points needed to execute the quest of each game once, the second condition is determined to be satisfied. When a game in which the second condition is satisfied exists (step S155: YES), the CPU 21 of the game server 20*a* may select any of the games or a certain number of the games from the games in which the second condition is satisfied with, for example, the method exemplified in the second embodiment (step S157). Next, the CPU 21 of the game server 20*a* creates HTML data including the power points of the game selected in step S157 (one or a plurality of games from the games B, C, D and etc.) in response to the HTTP request of the step S100 (step S160), and transmits the HTML data to the communication terminal 10 of the user U1 (step S170). Consequently, a web page of the game A is updated on the communication terminal 10 of the user U1 (step S180). The power points of the game selected in step S157 are included in the updated web page of the game A. When the response of step S150 is received, a banner for starting the execution of the game selected in step S157 is preferably included in the HTML data created in step S160.

The selection of the game in step S157 is not absolutely necessary, and the power points of all the games in which the second condition is satisfied and a banner for all the games may be included in the HTML data.

In the present embodiment as described above, the power points (user information) of the games B, C, D and etc. (second game) different from the game A (first game) that is accessed are not notified to the user in a random manner. The user may be notified about power points of a suitable second game by notifying the user of the power points when the second condition is satisfied. As a result, the power points of the second game in which the quest can be executed can be notified and the user can recognize the fact that a different game can be progressed at the point in time that the game A cannot be progressed.

Fifth Embodiment

In the present embodiment, an explanation will follow of a system configuration different from the game systems in the first to fourth embodiments.

Figure 18:
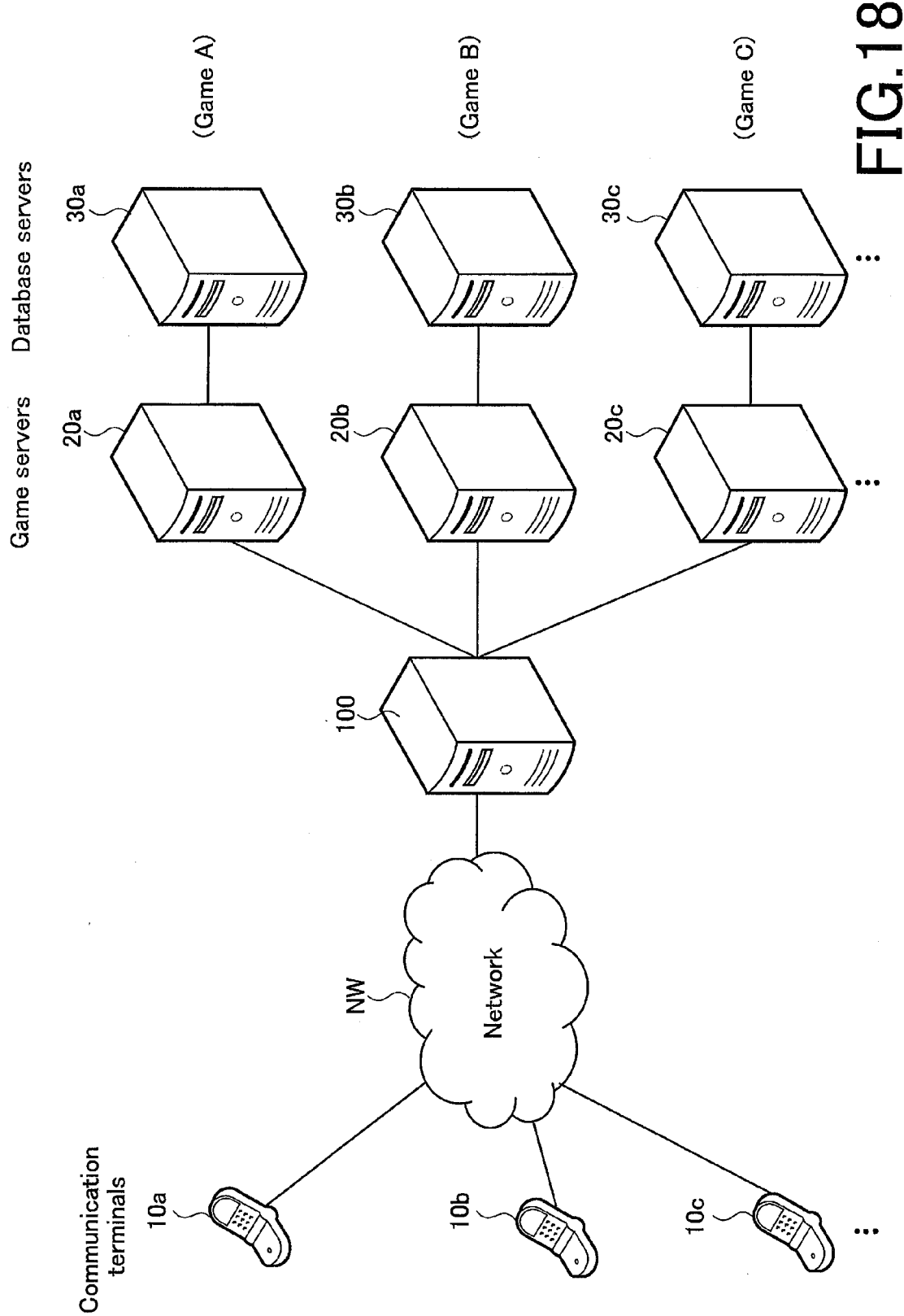
FIG. 18 is a basic configuration diagram of a game system according to the fifth embodiment.

FIG. 18 represents an exemplary system configuration of a game system according to the present embodiment. Constituent elements in the game system represented in FIG. 18 that are similar to those in the game system represented in FIG. 1 are, assigned the same reference numerals. A supervisory server 100 in the game system of the present embodiment is connected to the game servers 20*a*, 20*b*, 20*c* and etc. in a direct manner or is configured to be connectable through a network (not shown).

The supervisory server 100 in the present embodiment manages in an integrated manner the user information and the registration information of the game servers 20. In other words, the user information related to the games in which the users are registered is managed by the supervisory server 100. For example, when user information such as the power points are updated in the game servers 20, the supervisory server 100 is successively notified and the user information is stored and updated in a large capacity storage device (not represented) and the like in the supervisory server 100. When exchanging the user information between the game servers 20, the game server 20 intending to obtain the user information transmits a request including a user ID and the game for which the user information is to be obtained to the supervisory server 100, and the supervisory server 100 returns a response that includes the user information of the user ID in accordance with the request. That is, the supervisory server 100 includes a storage means for obtaining user information about the users of the games and storing and updating the user information in a large capacity storage device, and a provision means for providing the user information about any of the games of the specified user to the server.

The feature of not conducting direct data exchange through the API servers 26 of the game servers 20 is different from the game systems in the first to fourth embodiments.

When the information obtaining means 55 in one game control device obtains user information from another game control device, that is, when user information is exchanged directly between game control devices as described in the first to fourth embodiments, there is an advantage that traffic is reduced since information is exchanged without passing through another device.

When the information obtaining means 55 in a game control device obtains user information managed in another game control device through an information management device having the user information of a plurality of games, there is an advantage that the user information can be reliably obtained from the information management device even if, for example, communication between the game control devices is hampered.

The exemplary embodiments of the present invention have been explained in detail. However, the present invention is not limited to the aforementioned exemplary embodiments. Further, it is apparent that a variety of changes and modifications can be made for the respective exemplary embodiments without departing from the scope of the present invention. The technical features described in the above embodiments may be appropriately combined.

Although a case in which the user information (e.g., power points) is displayed in a game image such as a web page and the like as an aspect of notifying the user about the user information has been described in the above embodiments, the aspect of notifying the user information is not limited to displaying. The method of notifying the user about the user information may include a method of outputting the user information by sound. In this case, HTML data that includes compressed audio signals of the user information may be transmitted from the game servers 20 to the communication device 10 so that the sound may be outputted by decompressing and amplifying the compressed audio signals in the communication device 10. Causing the user information to be displayed as described in the above embodiments is preferred as an aspect of notifying. By employing a method of displaying the user information in a game image, the user is able to recognize the game images even in an environment (e.g., in a public transportation facility) where, for example, the output of sound is restricted. Furthermore, the user may fail to hear the user information when outputting the user information by sound, and thus unreliability of transmitting the information can be reduced by displaying the user information.

Although power points for progression of the game have been raised as an example of the user information in the above embodiments, the user information to be obtained may be appropriately set in the game properties and the first determining means in accordance with the contents of the first condition.

For example, in the case of a battle game in which the attack strength and defense strength of a game character fluctuate in accordance with the progress of the game, the user information may be a value of a game character parameter that indicates the attack strength or the defense strength.

Further, although a condition of not being able to progress in the game since the quest cannot be executed has been exemplified as the first condition in the above embodiments, the present invention is not limited to such a condition. For example, even though the game A can be progressed while the user is accessing the game A (e.g., the quest can be executed), the user information of a game other than the game A may be obtained and the user may be notified about the user information when a break occurs in the game A (e.g., a time when a search in a specific area of the quest is completed), or at periodical times after the game A has been accessed (e.g., at ten minute intervals). That is, the first condition may be after a certain time period has elapsed or may be when a position of a break in the game A has been reached due to the progression in the game A by the user.

For example, when an event aimed at the user occurs in a game other than the game A, such as when a friend application addressed to the user accessing the game A is received in a game other than the game A, or when an application or response for a trade addressed to the user occurs, the contents of that event may be notified as user information. Based on this type of notification, the user accessing the game A can access the other game at a suitable time to perform the required operation.

Further, the user information can be appropriately set in accordance with the game. For example, in an example of a game in which a user uses fertilizer and, the like to grow crops, a determination may be made as to whether the progress state of the game satisfies the first condition when the user's fertilizer is used up (namely, the game cannot be progressed).

To simplify understanding of the abovementioned embodiments, the game functions executed by the game servers 20 have been described as shared. However, the games executed by the game servers 20 may each have different functions (i.e., games with different properties). That is, the first condition determined by one game server 20 and the user information extracted by another game server 20 can be set independently of each other, and the games executed by the game servers 20 are not required to have shared functions. For example, if the power points are determined to have satisfied the first condition in the game server 20a, the user information provided by the game server 20b may be user information about a game not related in any way with the quest (e.g., the abovementioned growth level of the crops).

The notifying means 56 in the game control device may display information indicating that the first condition has been satisfied on a web page (game image) in addition to displaying the user information in a game image. Any method can be used as a display method such as a display with text as described in the abovementioned embodiments, or a display with a mark or other pattern. Consequently, it is convenient for the user since the required information is displayed with a single game image. Moreover, the time when an executed game cannot be continued and executed is a time that another game can be played (another game can be executed). However, the importance of the display of the information of the other game increases when considering which game to play instead when notified that the game that is being executed cannot be continued.

Although a certain operation input on the communication terminal by the user is assumed to be an input of a pressing operation of a certain operating button on the user's communication terminal or an input of a touch operation on a display screen on a communication terminal that includes a touch panel function in the abovementioned embodiments, the operation input is not limited as such. The operation input may be an operation input caused by shaking a communication terminal that includes an acceleration sensor, or may be an operation input based on a gesture (gesture input). With a gesture input, the communication terminal recognizes the gesture through image recognition by performing a certain gesture to the communication terminal that includes an imaging function and recognizes operation inputs previously associated with gestures. Moreover, the operation input may be conducted by inputting a sound if the communication terminal is able to execute a sound recognition program.

Although communication between the game servers 20 or between the game servers 20 and the supervisory server 100 has been described as performed by using HTTP through a Web API in the above embodiments, the present invention is not limited as such. A known, wired or wireless communication protocol may be appropriately used.

Although an example of the present invention as applied to a social networking game has been described in the abovementioned embodiments, the present invention is not limited as such. For example, it goes without saying that a game progression by users can be controlled in the same way as the abovementioned embodiments when a server device provided on a network and a household online game device are connected as a so-called online game system.

Figure 19A:
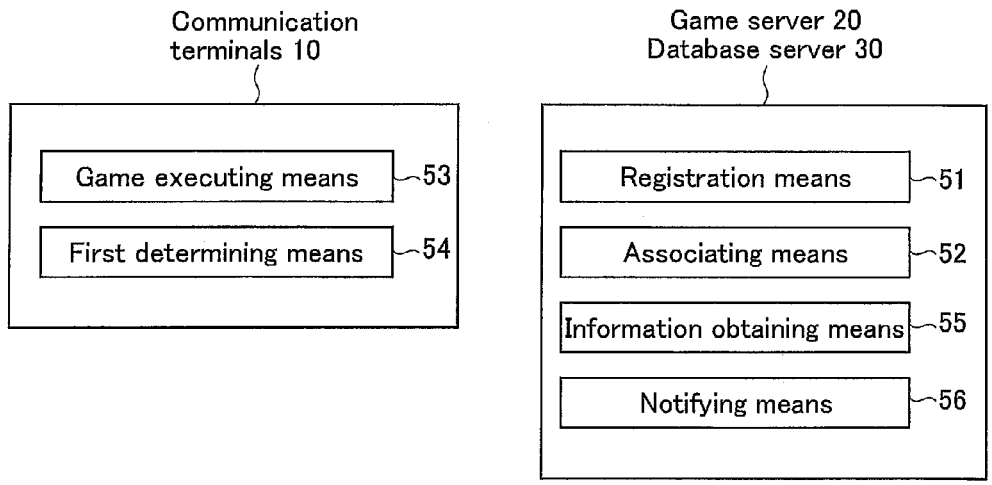
FIGS. 19A and 19B are exemplary diagrams of a distribution of functions of the game control device between a communication terminal, and a game server and a database server.
Figure 19B:
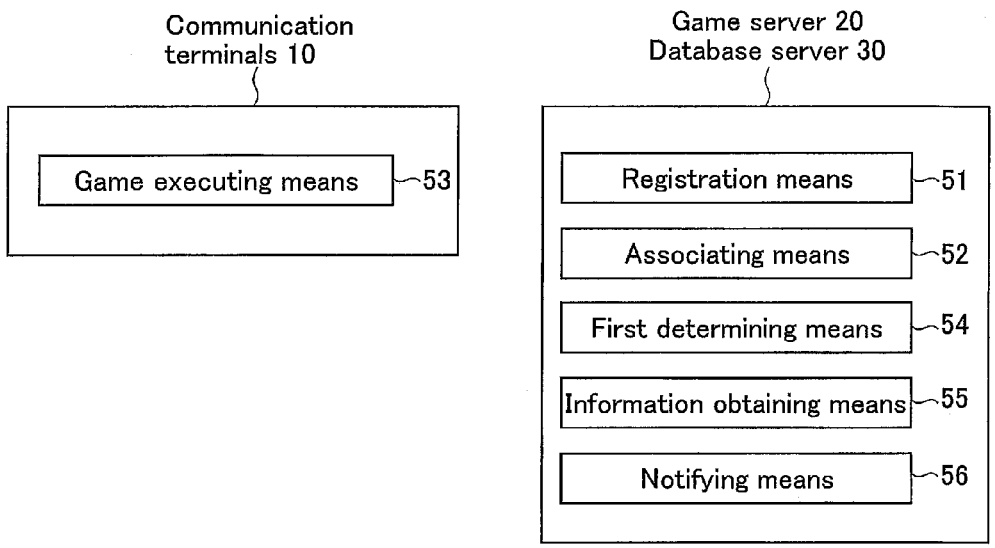

Although a configuration has been described in which the functions of the game executing means 53, the first determining means 54, the information obtaining means 55, the notifying means 56, the selecting means 57, and the second determining means 58 are realized by the game servers 20 and the database servers 30 on a network, the present invention is not limited to this configuration. At least a portion of the means may be configured to be realized by the communication terminal 10. In order for the communication terminal 10 and the game servers 20 to use substantially the same hardware configuration, the functions can be realized by the communication terminal 10 as described in the embodiments. FIGS. 19A and 19B each represent examples of distribution of the functions (functions represented in FIG. 9) of the game control device of the present embodiment between the communication terminal 10 and the game servers 20 and the database servers 30.

What is claimed is:
1. A game control device that communicates with a user communication terminal to enable a user to play a first game via communication with a user communication terminal, the game control device comprising:

a receiver configured to receive a request for starting the first game from the user communication terminal;
a processor configured to:
  determine, in response to the request, if a game application of the first game is operational,
  generate data for executing the first game in response to input by a user into the user communication terminal, if the game application of the first game is operational, and
  select a second game if the game application of the first game is not operational, from a plurality of games that are associated with the first game;
an application programming interface (API) server configured to send a request, based on a control of the processor, for a first storage device that stores one or more parameters associated with the user in the plurality of games that are associated with the first game or a second storage device that stores one or more parameters associated with the user in the second game, to transmit the one or more parameters associated with the user in the second game if the processor has determined that the game application of the first game is not operational, the one or more parameters being set to decrease during the execution of the second game and to increase each time a certain period of time elapses; and
a first transmitter configured to transmit the data generated by the processor to the user communication terminal if the processor has determined that the application of the first game is operational, and to transmit the parameters associated with the user in the second game received by the API server to the user communication terminal if the processor has determined that the game application of the first game is not operational.

2. The game control device according to claim 1, wherein the processor is configured to receive user registration information from a third storage device that stores the registration information related to the user, and to select, on the basis of the registration information, the second game from the games that are associated with the first game.

3. The game control device according to claim 2, wherein the registration information includes information related to a user gender or a user age.

4. The game control device according to claim 1, wherein the processor is configured to determine whether the one or more parameters associated with the user in the second game satisfy a condition; and
the transmitter is configured to transmit the one or more parameters associated with the user in the second game to the user communication terminal when the condition is determined to be satisfied by the processor.

5. The game control device according to claim 1, wherein the second storage device that stores the one or more parameters associated with the user in the second game is included in another game control device that executes the second game.

6. The game control device according to claim 1, wherein the first storage device that stores the one or more parameters associated with the user in the plurality of games that are associated with the first game is included in an information management device having user information for the plurality of games.

7. The game control device according to claim 1, wherein the transmitter is configured to transmit game image data of the first game that includes the one or more parameters associated with the user in the second game, to the user communication terminal of the user.

8. The game control device according to claim 7, wherein the game image data of the first game further includes information indicating that the game application of the first game is not operational.

9. The game control device according to claim 7, wherein the game image data of the first game further includes an operating target for starting execution of the second game.

10. A game control device that communicates with a user communication terminal to enable a user to play a first game via communication with a user communication terminal, the game control device comprising:
a receiver configured to receive a request for starting the first game from the user communication terminal;
a processor configured to:
  determine, in response to the request, if a game application of the first game is operational,
  generate data for executing the first game in response to input by a user into the communication terminal, if the application of the first game are operational, and
  select a second game if the game application of the first game is not operational, from a plurality of games that are associated with the user;
an application programming interface (API) server configured to send a request, based on a control of the processor, for a first storage device that stores one or more parameters associated with the user in the plurality of games that are associated with the user or a second storage device that stores one or more parameters associated with the user in the second game, to transmit the one or more parameters associated with the user in the second game if the processor has determined that the game application of the first game is not operational, the one or more parameters being set to decrease during the execution of the second game and to increase each time a certain period of time elapses; and
a first transmitter configured to transmit the data generated by the processor to the user communication terminal if the processor has determined that the game application of the first game are operational, and to transmit the one or more parameters associated with the user in the second game received by the API server to the user communication terminal if the processor has determined that the game application of the first game is not operational.

11. The game control device according to claim 10, wherein
the processor is configured to determine whether the one or more parameters associated with the user in the second game satisfy a condition; and
the transmitter is configured to transmit the one or more parameters associated with the user in the second game to the user communication terminal when the condition is determined to be satisfied by the processor.

12. The game control device according to claim 10, wherein
the second storage device that stores the one or more parameters associated with the user in the second game is included in another game control device that executes the second game.

13. The game control device according to claim 10, wherein
the first storage device that stores the one or more parameters associated with the user in the plurality of games that are associated with the user is included in from an information management device having user information for the plurality of games.

14. The game control device according to claim 10, wherein
the transmitter is configured to transmit game image data of the first game that includes the one or more parameters associated with the user in the second game, to the user communication terminal.

15. The game control device according to claim 14, wherein
the game image data of the first game further includes information indicating that the application of the first game is not operational.

16. The game control device according to claim 14, wherein
the game image data of the first game further includes an operating target for starting execution of the second game.

17. A non-transitory computer readable storage medium having computer executable instructions stored thereon that, when executed by a computer, cause the computer to:
input a request for starting a first game from a user communication terminal;
determine, in response to the request, if a game application of the first game is operational;
generate data for executing the first game in response to input by a user into the user communication terminal, if the game application of the first game is operational;
select a second game if the game application of the first game is not operational, from a plurality of games that are associated with the first game;
send a request for a first storage device that stores one or more parameters associated with the user in the plurality of games that are associated with the first game, to transmit one or more parameters associated with the user in the second game if determined that the game application of the first game is not operational the one or more parameters being set to decrease during the execution of the second game and to increase each time a certain period of time elapses; and
transmit the generated data to the user communication terminal if the game application of the first game is operational, and transmit the received one or more parameters associated with the user in the second game to the user communication terminal if the game application of the first game is not operational.

18. A non-transitory computer readable storage medium having computer executable instructions stored thereon that, when executed by a computer, cause the computer to:
input a request for starting a first game from a user communication terminal;
determine, in response to the request, if a game application of the first game is operational;
generate data for executing the first game in response to input by a user into the user communication terminal, if the game application of the first game is operational;
select a second game if the game application of the first game is not operational, from a plurality of games that are associated with the user;
send a request for a first storage device that stores one or more parameters associated with the user in the plurality of games that are associated with the user, to transmit one or more parameters associated with the user in the second game if determined that the game application of the first game is not operational the one or more parameters being set to decrease during the execution of the second game and to increase each time a certain period of time elapses; and
transmit the generated data to the user communication terminal if the game application of the first game are operational user in the second game to the user communication terminal if the game application of the first game is not operational.

19. A game control method of a first game server that executes a first game, the method comprising:
receiving, by a processor, a request for starting the first game from a user communication terminal;
determining, by the processor, in response to the request, if a game application of the first game is operational;
generating data, by the processor, for executing the first game in response to input by a user into the user communication terminal, if the game application of the first game is operational;
selecting, by the processor, a second game if the game application of the first game is not operational, from a plurality of games that are associated with the first game;
sending a request, to a second game server that stores one or more parameters associated with the user in the second game, to transmit the one or more parameters associated with the user in the second game if the processor has determined that the game application of the first game is not operational, the one or more parameters being set to decrease during the execution of the second game and to increase each time a certain period of time elapses;
receiving, from the second game server, one or more parameters associated with the user in the second game in accordance with the request; and
transmitting the generated data to the user communication terminal if the processor has determined that the game application of the first game is operational, and transmitting the one or more parameters associated with the user in the second game received from the second game server to the user communication terminal if the processor has determined that the game application of the first game is not operational.

20. A game system including a first game server and a supervisory server, the first game server enabling a user to play a first game via communication with a user communication terminal,
the first game server comprising:
a receiver configured to receive a request for starting the first game from the user communication terminal;
a processor configured to:
determine, in response to the request, if a game application of the first game is operational,
generate data for executing the first game in response to input by a user into the user communication terminal, if the game application of the first game is operational, and
select a second game if the game application of the first game is not operational, from a plurality of games that are associated with the first game;
an application programming interface (API) server configured to send a request, based on a control of the processor, for the supervisory server to transmit one or more parameters associated with the user in the second game if the processor has determined that the game application of the first game is not operational, the one or more parameters being set to decrease during the execution of the second game and to increase each time a certain period of time elapses; and
a first transmitter configured to transmit the data generated by the processor to the user communication terminal if the processor has determined that the game application of the first game is operational, and to transmit the one or more parameters associated with the user in the second game received by the API server to the user communication terminal if the processor has determined that the game application of the first game is not operational, the supervisory server comprising
a first storage device that stores the one or more parameters associated with the user in the plurality of games that are associated with the first game, and
a second transmitter configured to transmit, in response to a request from the API server of the first game server, the one or more parameters associated with the user in the second game to the first game server.

21. A game system including a first game server and a supervisory server, the first game enabling a user to play a first game via communication with a user communication terminal, the first game server comprising:
a receiver configured to receive a request for starting the first game from the user communication terminal;
a processor configured to:
determine, in response to the request, if a game application of the first game is operational,
generate data for executing the first game in response to input by a user into the user communication terminal, if the game application of the first game is operational, and
select a second game if the game application of the first game is not operational, from a plurality of games that are associated with the user;
an application programming interface (API) server configured to send a request, based on a control of the processor, for the supervisory server to transmit one or more parameters associated with the user in the second game if the processor has determined that the game application of the first game is not operational, the one or more parameters being set to decrease during the execution of the second game and to increase each time a certain period of time elapses; and
a first transmitter configured to transmit the data generated by the processor to the user communication terminal if the processor has determined that the game application of the first game is operational, and to transmit the one or more parameters associated with the user in the second game received by the API server to the user communication terminal if the processor has determined that the game application of the first game is not operational, the supervisory server comprising
a first storage device that stores the one or more parameters associated with the user in the plurality of games that are associated with the user, and
a second transmitter configured to transmit, in response to a request from the API server of the first game server, the one or more parameters associated with the user in the second game to the first game server.

* * * * *